(12) United States Patent
Bannister et al.

(10) Patent No.: US 11,304,565 B2
(45) Date of Patent: Apr. 19, 2022

(54) VACUUM FOOD PROCESSING SYSTEM

(71) Applicant: SharkNinja Operating LLC, Needham, MA (US)

(72) Inventors: Sam William Bannister, Leybourne (GB); Ross Richardson, Dover, MA (US); Michael Ting, Boston, MA (US); Jared J. Proulx, Needham, MA (US); Kristof Benedict Fogarasi, Norwood, MA (US); Joshua D. Anthony, Billerica, MA (US); Nicholas Michael O'Loughlin, Hong Kong (CN); Kevin Pei, Guangdong (CN); Zintis Jones, London (GB)

( * ) Notice: Subject to any disclaimer, the term of this patent is extended or adjusted under 35 U.S.C. 154(b) by 0 days.

(21) Appl. No.: 16/813,212

(22) Filed: Mar. 9, 2020

(65) Prior Publication Data
US 2020/0281409 A1 Sep. 10, 2020

Related U.S. Application Data

(60) Provisional application No. 62/815,992, filed on Mar. 8, 2019.

(51) Int. Cl.
*A47J 43/046* (2006.01)
*A47J 43/07* (2006.01)

(52) U.S. Cl.
CPC ......... *A47J 43/0716* (2013.01); *A47J 43/046* (2013.01)

(58) Field of Classification Search
CPC ...... A47J 43/06; A47J 43/046; A47J 43/0716; A47J 43/0727; A47J 43/0777
See application file for complete search history.

(56) References Cited

U.S. PATENT DOCUMENTS

| | | |
|---|---|---|
| 293,190 A | 2/1884 | Moore |
| 959,581 A | 5/1910 | Newton |
| 1,997,914 A | 4/1935 | Pollard |
| 2,121,621 A | 6/1938 | Adams |
| 2,121,622 A | 6/1938 | Bean |
| 2,209,559 A | 7/1940 | Brennan et al. |
| 2,355,010 A | 8/1944 | Pera |

(Continued)

FOREIGN PATENT DOCUMENTS

| | | |
|---|---|---|
| CN | 1987102824 A | 10/1987 |
| CN | 1073149 A | 6/1993 |

(Continued)

OTHER PUBLICATIONS

US 6,592,248 B2, 07/2003, Kressin et al. (withdrawn)

(Continued)

*Primary Examiner* — Matthew Katcoff
(74) *Attorney, Agent, or Firm* — Burns & Levinson, LLP; Joseph M. Maraia

(57) ABSTRACT

An accessory for use with a container of a food processing system includes a body positionable within a base of the food processing system, said body having a first side and a second side, an opening formed in said body, a member configurable with said opening to selectively seal said opening, said member being arranged at said second side of said body, a vacuum sealing assembly for sealing a chamber of the container, and a release mechanism operable to selectively fluidly couple said chamber to an ambient atmosphere.

20 Claims, 12 Drawing Sheets

(56) References Cited

U.S. PATENT DOCUMENTS

| | | |
|---|---|---|
| 2,616,593 A | 11/1952 | Leibenhaut |
| 2,761,659 A | 4/1956 | Collura |
| 2,885,134 A | 5/1959 | Cohen |
| 2,992,118 A | 7/1961 | Daline |
| 3,288,344 A | 11/1966 | Woollen et al. |
| 3,406,868 A | 10/1968 | Rogers |
| 3,521,863 A | 7/1970 | Graham |
| 3,534,435 A | 10/1970 | John |
| 3,557,411 A | 1/1971 | Ravasi |
| D242,208 S | 11/1976 | Madl et al. |
| 4,016,998 A | 4/1977 | Finch |
| 4,185,072 A | 1/1980 | Puderbaugh et al. |
| D255,313 S | 6/1980 | Elkerbout |
| 4,645,097 A | 2/1987 | Kaufman |
| 4,928,857 A | 5/1990 | Ecker |
| 4,955,724 A | 9/1990 | Otto |
| 5,005,717 A | 4/1991 | Oilar |
| 5,168,797 A | 12/1992 | Wang |
| 5,257,862 A | 11/1993 | Gardner |
| 5,328,262 A | 7/1994 | Lidgren et al. |
| D349,455 S | 8/1994 | Kostanecki et al. |
| 5,348,391 A | 9/1994 | Murray |
| D351,993 S | 11/1994 | Kaufman et al. |
| 5,368,386 A | 11/1994 | Murray |
| 5,423,476 A | 6/1995 | Ferrer |
| 5,460,264 A | 10/1995 | Rupert |
| 5,501,520 A | 3/1996 | Lidgren et al. |
| 5,558,257 A | 9/1996 | Braun |
| 5,597,089 A | 1/1997 | Smith |
| 5,603,567 A | 2/1997 | Peacock |
| D378,493 S | 3/1997 | Subbaraman et al. |
| D380,674 S | 7/1997 | Smith |
| 5,662,032 A | 9/1997 | Baratta |
| 5,667,101 A | 9/1997 | Barrash et al. |
| 5,690,021 A | 11/1997 | Grey |
| 5,797,680 A | 8/1998 | Murray |
| 5,857,771 A | 1/1999 | Draenert |
| D413,798 S | 9/1999 | Lamarra |
| 5,957,340 A | 9/1999 | Sawicki |
| 6,065,861 A | 5/2000 | Chen |
| 6,092,905 A | 7/2000 | Koehn |
| 6,135,019 A | 10/2000 | Chou |
| 6,213,358 B1 | 4/2001 | Libit et al. |
| 6,223,652 B1 | 5/2001 | Calia et al. |
| 6,321,977 B1 | 11/2001 | Lee |
| 6,491,961 B1 | 12/2002 | Balentine et al. |
| 6,499,873 B1 | 12/2002 | Chen |
| 6,712,496 B2 | 3/2004 | Kressin et al. |
| D490,468 S | 5/2004 | Akers |
| 6,780,454 B2 | 8/2004 | Balentine et al. |
| D498,642 S | 11/2004 | Huang |
| D498,643 S | 11/2004 | Pryor, Jr. et al. |
| 6,817,280 B2 | 11/2004 | Hall et al. |
| 6,817,750 B1 | 11/2004 | Sands |
| 6,860,313 B2 | 3/2005 | Greissing et al. |
| D518,332 S | 4/2006 | Feil |
| 7,044,051 B2 | 5/2006 | Le Rouzic |
| 7,066,640 B2 | 6/2006 | Sands |
| 7,100,851 B2 | 9/2006 | Hiraki et al. |
| 7,104,185 B2 | 9/2006 | Leung et al. |
| D530,568 S | 10/2006 | Wingenter |
| D537,303 S | 2/2007 | Stuckey |
| D538,595 S | 3/2007 | White et al. |
| D559,037 S | 1/2008 | Johansson |
| D560,512 S | 1/2008 | Safar |
| 7,314,136 B2 | 1/2008 | Stefandl |
| D564,832 S | 3/2008 | Bodum |
| 7,422,362 B2 | 9/2008 | Sands |
| D578,340 S | 10/2008 | Picozza et al. |
| 7,430,957 B2 | 10/2008 | Sands |
| 7,441,944 B2 | 10/2008 | Sands |
| 7,490,743 B2 | 2/2009 | Herzog |
| 7,543,925 B2 | 6/2009 | Ishizawa et al. |
| D605,462 S | 12/2009 | Picozza et al. |
| 7,858,135 B2 | 12/2010 | Radosav |
| 7,938,574 B2 * | 5/2011 | McGill ............... A47J 43/0727 366/199 |
| 7,958,819 B2 | 6/2011 | Sands |
| D642,858 S | 8/2011 | Lazzer |
| D644,072 S | 8/2011 | McDonald et al. |
| D644,875 S | 9/2011 | Audette |
| 8,021,699 B2 | 9/2011 | Yoshikawa et al. |
| D647,357 S | 10/2011 | Audette et al. |
| D647,367 S | 10/2011 | Audette et al. |
| 8,047,124 B2 | 11/2011 | Lin |
| 8,047,702 B1 | 11/2011 | Lopresti |
| D654,316 S | 2/2012 | Audette |
| 8,122,821 B2 | 2/2012 | Sands |
| D663,580 S | 7/2012 | Vagnby |
| D668,115 S | 10/2012 | Potter |
| D670,958 S | 11/2012 | Picozza et al. |
| 8,383,180 B2 | 2/2013 | Vastardis |
| D677,976 S | 3/2013 | Palermo et al. |
| 8,387,520 B2 | 3/2013 | Backus |
| 8,475,860 B2 | 7/2013 | Colantonio et al. |
| 8,485,383 B2 | 7/2013 | Taufer |
| 8,561,314 B2 | 10/2013 | Kruger |
| 8,568,811 B2 | 10/2013 | Sasame et al. |
| 8,586,117 B2 | 11/2013 | Vastardis et al. |
| 8,672,533 B2 | 3/2014 | Reyes et al. |
| D704,502 S | 5/2014 | Coakley et al. |
| D705,606 S | 5/2014 | Coakley et al. |
| 8,770,099 B2 | 7/2014 | Reyhanloo |
| D711,688 S | 8/2014 | Prats |
| 8,807,022 B2 | 8/2014 | Backus |
| D712,188 S | 9/2014 | Averty |
| 8,869,686 B2 | 10/2014 | Backus |
| D721,536 S | 1/2015 | Advani |
| 8,960,084 B2 | 2/2015 | Lee |
| 8,960,578 B2 | 2/2015 | Byrne |
| 8,960,993 B2 | 2/2015 | Cheio De Oliveira et al. |
| D727,173 S | 4/2015 | De Jong |
| 8,997,633 B2 | 4/2015 | Bishop et al. |
| 8,998,176 B2 | 4/2015 | Bishop et al. |
| D728,381 S | 5/2015 | Ferraro |
| 9,039,274 B1 * | 5/2015 | Corda ............... A47J 43/046 366/199 |
| D730,682 S | 6/2015 | Tu |
| D730,683 S | 6/2015 | Tu |
| D731,242 S | 6/2015 | Machovina et al. |
| D731,243 S | 6/2015 | Machovina et al. |
| 9,051,073 B2 | 6/2015 | Jennings et al. |
| D733,488 S | 7/2015 | Tu |
| D734,637 S | 7/2015 | Benoit et al. |
| 9,113,750 B2 | 8/2015 | Clark et al. |
| D739,678 S | 9/2015 | Benoit et al. |
| D740,063 S | 10/2015 | Katz |
| 9,149,065 B2 | 10/2015 | Hoare et al. |
| D742,691 S | 11/2015 | Zhang |
| D743,204 S | 11/2015 | Zhang |
| 9,199,779 B2 | 12/2015 | Zoss et al. |
| D747,135 S | 1/2016 | Ha |
| 9,295,358 B2 | 3/2016 | Vastardis et al. |
| D755,003 S | 5/2016 | Palermo et al. |
| 9,345,795 B2 | 5/2016 | Saura Lopez et al. |
| 9,402,405 B2 | 8/2016 | Vastardis et al. |
| 9,402,410 B2 | 8/2016 | So |
| 9,414,711 B2 | 8/2016 | Tonelli et al. |
| D765,465 S | 9/2016 | Du |
| D767,334 S | 9/2016 | Pan |
| D768,437 S | 10/2016 | Lane |
| D769,061 S | 10/2016 | Diderotto |
| 9,474,403 B2 | 10/2016 | Chen |
| D771,434 S | 11/2016 | Burrows |
| D771,999 S | 11/2016 | Kettavong et al. |
| 9,486,107 B2 | 11/2016 | Kobylarz |
| D776,978 S | 1/2017 | Machovina et al. |
| 9,555,384 B2 | 1/2017 | Haney et al. |
| D778,665 S | 2/2017 | Barquin et al. |
| D779,265 S | 2/2017 | Barquin et al. |
| 9,565,872 B2 | 2/2017 | Corkin et al. |
| D780,507 S | 3/2017 | Barquin et al. |
| D783,340 S | 4/2017 | Palermo et al. |
| D783,355 S | 4/2017 | Tu |

(56) References Cited

U.S. PATENT DOCUMENTS

| | | |
|---|---|---|
| D784,761 S | 4/2017 | Tu |
| 9,624,024 B2 | 4/2017 | Vilinsky |
| 9,630,828 B1 | 4/2017 | Gardner |
| D789,735 S | 6/2017 | Palermo et al. |
| D789,736 S | 6/2017 | Palermo et al. |
| 9,675,212 B2 | 6/2017 | Hewitt et al. |
| 9,687,111 B1 | 6/2017 | Trojan |
| D793,153 S | 8/2017 | Tu |
| D794,384 S | 8/2017 | Lee |
| D797,496 S | 9/2017 | Gee, II et al. |
| D798,101 S | 9/2017 | Rose et al. |
| 9,763,461 B2 | 9/2017 | Vastardis et al. |
| D804,248 S | 12/2017 | Tu |
| D807,700 S | 1/2018 | Tu |
| D808,718 S | 1/2018 | Coakley |
| D808,719 S | 1/2018 | Coakley |
| 9,855,535 B2 | 1/2018 | Arnett et al. |
| D809,333 S | 2/2018 | Lee |
| 9,888,807 B2 | 2/2018 | Starr et al. |
| D811,806 S | 3/2018 | Bock |
| D813,603 S | 3/2018 | Tu |
| D813,604 S | 3/2018 | Tu |
| 9,907,430 B2 | 3/2018 | Vastardis et al. |
| 9,924,824 B2 | 3/2018 | Backus |
| 9,924,837 B1 | 3/2018 | Trojan |
| 9,924,838 B2 | 3/2018 | Potter et al. |
| 9,930,986 B2 | 4/2018 | Arai et al. |
| D816,383 S | 5/2018 | Liang |
| 9,962,030 B2 | 5/2018 | Avins et al. |
| 9,993,105 B2 | 6/2018 | Bishop et al. |
| 9,999,319 B2 | 6/2018 | Kim |
| D821,806 S | 7/2018 | Coakley et al. |
| 10,055,347 B1 | 8/2018 | Trojan |
| D832,029 S | 10/2018 | Gee, II et al. |
| 10,105,003 B2 | 10/2018 | Tsutsumi et al. |
| 10,117,444 B2 | 11/2018 | Vastardis et al. |
| 10,123,650 B2 | 11/2018 | McLaughlin et al. |
| D834,878 S | 12/2018 | Moon et al. |
| D835,463 S | 12/2018 | Coakley |
| 10,143,323 B2 | 12/2018 | Backus |
| 10,182,680 B2 | 1/2019 | Koetz |
| 10,196,595 B2 | 2/2019 | Butte |
| 10,213,047 B2 | 2/2019 | Boggavarapu |
| D842,643 S | 3/2019 | Mullen et al. |
| D842,644 S | 3/2019 | Kettavong et al. |
| 10,226,147 B2 | 3/2019 | Harper |
| D846,337 S | 4/2019 | Duan et al. |
| D846,338 S | 4/2019 | Smith et al. |
| D846,339 S | 4/2019 | Smith |
| 10,299,629 B2 | 5/2019 | Bascom et al. |
| D851,982 S | 6/2019 | Deleo et al. |
| D852,566 S | 7/2019 | Chen |
| D860,724 S | 9/2019 | Kassin et al. |
| D865,438 S | 11/2019 | Coakley et al. |
| D867,804 S | 11/2019 | Gronkowski |
| 10,617,260 B2 | 4/2020 | Sapire |
| 10,736,465 B2 | 8/2020 | Dickson, Jr. et al. |
| 10,799,071 B2 | 10/2020 | Pamplin |
| 2001/0000570 A1 | 5/2001 | Aarts |
| 2002/0009401 A1 | 1/2002 | Osborn |
| 2003/0227818 A1 | 12/2003 | Villwock et al. |
| 2004/0025703 A1 | 2/2004 | Ming |
| 2004/0065668 A1 | 4/2004 | Lee |
| 2004/0155063 A1 | 8/2004 | Hofeldt |
| 2004/0159243 A1 | 8/2004 | Theodos |
| 2004/0173105 A1 | 9/2004 | Kim et al. |
| 2004/0195120 A1 | 10/2004 | Anderson |
| 2004/0208079 A1 | 10/2004 | Hein |
| 2005/0229795 A1 | 10/2005 | Stuckey |
| 2005/0269336 A1 | 12/2005 | Rockhill et al. |
| 2006/0000369 A1 | 1/2006 | Hsu |
| 2006/0120215 A1 | 6/2006 | Sands |
| 2006/0124536 A1 | 6/2006 | Guerrero |
| 2007/0183256 A1 | 8/2007 | Sands |
| 2008/0037360 A1 | 2/2008 | McGill |
| 2008/0067195 A1 | 3/2008 | Jennings et al. |
| 2009/0084275 A1 | 4/2009 | Liang |
| 2009/0165655 A1 | 7/2009 | Aonuma |
| 2009/0229478 A1 | 9/2009 | Wu |
| 2009/0266787 A1 | 10/2009 | Son |
| 2009/0297671 A1 | 12/2009 | Basker et al. |
| 2010/0003379 A1 | 1/2010 | Zoss et al. |
| 2010/0203209 A1 | 8/2010 | Fishbein et al. |
| 2011/0127297 A1 | 6/2011 | Jennings et al. |
| 2012/0152131 A1 | 6/2012 | Sands |
| 2012/0196014 A1 | 8/2012 | Yao |
| 2013/0133521 A1 | 5/2013 | Vastardis |
| 2014/0247686 A1 | 9/2014 | Arnett et al. |
| 2014/0286123 A1 | 9/2014 | Arnett et al. |
| 2014/0290503 A1 | 10/2014 | Bae |
| 2015/0059597 A1 | 3/2015 | Lee |
| 2015/0098299 A1 | 4/2015 | Sapire |
| 2015/0138910 A1 | 5/2015 | Cha et al. |
| 2015/0146496 A1 | 5/2015 | Lucon et al. |
| 2015/0201808 A1 | 7/2015 | Katsuki et al. |
| 2015/0208844 A1 | 7/2015 | Liang |
| 2015/0351567 A1 | 12/2015 | Tristram |
| 2016/0183582 A1 | 6/2016 | Bauer |
| 2016/0220071 A1 | 8/2016 | Hewitt et al. |
| 2016/0255983 A1 | 9/2016 | Barquin et al. |
| 2016/0256003 A1* | 9/2016 | Altenritter ............. G01G 19/52 |
| 2016/0324358 A1 | 11/2016 | Backus |
| 2016/0324369 A1 | 11/2016 | Lee |
| 2016/0331182 A1 | 11/2016 | Golino |
| 2016/0345773 A1 | 12/2016 | Tonelli et al. |
| 2016/0348962 A1 | 12/2016 | Roekens et al. |
| 2016/0367063 A1 | 12/2016 | Vastardis et al. |
| 2017/0007067 A1 | 1/2017 | Shima et al. |
| 2017/0049260 A1 | 2/2017 | Beber et al. |
| 2017/0086622 A1 | 3/2017 | Chung |
| 2017/0095122 A1 | 4/2017 | Hoare et al. |
| 2017/0143155 A1 | 5/2017 | Lin |
| 2017/0150744 A1 | 6/2017 | Wangler |
| 2017/0164776 A1 | 6/2017 | Floessholzer et al. |
| 2017/0224166 A1 | 8/2017 | Sedlacek et al. |
| 2017/0231431 A1 | 8/2017 | Maeng |
| 2017/0245668 A1 | 8/2017 | Upston et al. |
| 2017/0295982 A1 | 10/2017 | Holzbauer et al. |
| 2017/0295992 A1 | 10/2017 | Mangold et al. |
| 2017/0303571 A1 | 10/2017 | Alden |
| 2017/0341253 A1 | 11/2017 | Arriens et al. |
| 2018/0014695 A1 | 1/2018 | Gross et al. |
| 2018/0043321 A1 | 2/2018 | Mochizuki |
| 2018/0079584 A1 | 3/2018 | Jung |
| 2018/0098666 A1 | 4/2018 | Le |
| 2018/0192814 A1 | 7/2018 | Gormley et al. |
| 2018/0192815 A1 | 7/2018 | Vastardis et al. |
| 2018/0199762 A1 | 7/2018 | Kim |
| 2018/0220829 A1 | 8/2018 | Zhang et al. |
| 2018/0222679 A1 | 8/2018 | Iwasaka et al. |
| 2018/0225205 A1* | 8/2018 | Trojan ................ A47J 43/0716 |
| 2018/0296022 A1 | 10/2018 | Avins et al. |
| 2018/0310769 A1 | 11/2018 | Kim |
| 2018/0326378 A1 | 11/2018 | Moon |
| 2018/0360256 A1 | 12/2018 | Ford et al. |
| 2018/0360271 A1 | 12/2018 | Katsuki et al. |
| 2019/0000272 A1 | 1/2019 | Katsuki et al. |
| 2019/0009233 A1 | 1/2019 | Furman et al. |
| 2019/0059409 A1 | 2/2019 | Vastardis et al. |
| 2020/0281408 A1 | 9/2020 | Bannister et al. |
| 2020/0281410 A1 | 9/2020 | Bannister et al. |
| 2021/0078776 A1* | 3/2021 | Sterngold ............ B65D 55/026 |

FOREIGN PATENT DOCUMENTS

| | | |
|---|---|---|
| CN | 1255841 A | 6/2000 |
| CN | 2390533 Y | 8/2000 |
| CN | 1432518 A | 7/2003 |
| CN | 1162115 C | 8/2004 |
| CN | 1525830 A | 9/2004 |
| CN | 1586378 A | 3/2005 |
| CN | 1213686 C | 8/2005 |
| CN | 1655707 A | 8/2005 |
| CN | 2730269 Y | 10/2005 |

(56) References Cited

FOREIGN PATENT DOCUMENTS

| | | | |
|---|---|---|---|
| CN | 1792306 | A | 6/2006 |
| CN | 1268263 | C | 8/2006 |
| CN | 2808015 | Y | 8/2006 |
| CN | 1282438 | C | 11/2006 |
| CN | 100337572 | C | 9/2007 |
| CN | 201001611 | Y | 1/2008 |
| CN | 201067329 | Y | 6/2008 |
| CN | 100418461 | C | 9/2008 |
| CN | 100522753 | C | 8/2009 |
| CN | 100581426 | C | 1/2010 |
| CN | 101663142 | A | 3/2010 |
| CN | 101238036 | B | 5/2010 |
| CN | 101291609 | B | 6/2010 |
| CN | 201505039 | U | 6/2010 |
| CN | 101779928 | A | 7/2010 |
| CN | 101181127 | B | 2/2011 |
| CN | 102058327 | A | 5/2011 |
| CN | 102083345 | A | 6/2011 |
| CN | 102123600 | A | 7/2011 |
| CN | 201899357 | U | 7/2011 |
| CN | 201977619 | U | 9/2011 |
| CN | 102245068 | A | 11/2011 |
| CN | 101854839 | B | 5/2012 |
| CN | 102429590 | A | 5/2012 |
| CN | 101637242 | B | 6/2012 |
| CN | 102670096 | A | 9/2012 |
| CN | 101522039 | B | 10/2012 |
| CN | 202681713 | U | 1/2013 |
| CN | 202698925 | U | 1/2013 |
| CN | 207613666 | U | 1/2013 |
| CN | 102984951 | B | 3/2013 |
| CN | 202875005 | U | 4/2013 |
| CN | 203074329 | U | 7/2013 |
| CN | 203447138 | U | 2/2014 |
| CN | 103857317 | A | 6/2014 |
| CN | 203647102 | U | 6/2014 |
| CN | 102355839 | B | 8/2014 |
| CN | 103960992 | A | 8/2014 |
| CN | 104305872 | A | 1/2015 |
| CN | 102292011 | B | 4/2015 |
| CN | 102631153 | B | 4/2015 |
| CN | 204274217 | A | 4/2015 |
| CN | 204600200 | U | 9/2015 |
| CN | 204698308 | A | 10/2015 |
| CN | 103813741 | B | 12/2015 |
| CN | 103354793 | B | 2/2016 |
| CN | 105455688 | A | 4/2016 |
| CN | 105520659 | A | 4/2016 |
| CN | 105686701 | A | 6/2016 |
| CN | 105919396 | A | 9/2016 |
| CN | 105996826 | A | 10/2016 |
| CN | 205658804 | U | 10/2016 |
| CN | 106073538 | A | 11/2016 |
| CN | 106108596 | A | 11/2016 |
| CN | 106108599 | A | 11/2016 |
| CN | 106108709 | A | 11/2016 |
| CN | 106136903 | A | 11/2016 |
| CN | 106136961 | A | 11/2016 |
| CN | 106136962 | A | 11/2016 |
| CN | 103126552 | B | 12/2016 |
| CN | 106231966 | A | 12/2016 |
| CN | 106235907 | A | 12/2016 |
| CN | 106264202 | A | 1/2017 |
| CN | 106333616 | A | 1/2017 |
| CN | 106361183 | A | 2/2017 |
| CN | 106377152 | A | 2/2017 |
| CN | 106377181 | A | 2/2017 |
| CN | 106419642 | A | 2/2017 |
| CN | 104720553 | B | 3/2017 |
| CN | 103720339 | B | 4/2017 |
| CN | 104853657 | B | 4/2017 |
| CN | 106580133 | A | 4/2017 |
| CN | 206062911 | U | 4/2017 |
| CN | 106659310 | A | 5/2017 |
| CN | 106724559 | A | 5/2017 |
| CN | 106724947 | A | 5/2017 |
| CN | 106742714 | A | 5/2017 |
| CN | 106798496 | A | 6/2017 |
| CN | 206227556 | U | 6/2017 |
| CN | 106974565 | A | 7/2017 |
| CN | 206295245 | U | 7/2017 |
| CN | 206324658 | U | 7/2017 |
| CN | 107019425 | A | 8/2017 |
| CN | 107019441 | A | 8/2017 |
| CN | 107049072 | A | 8/2017 |
| CN | 107088005 | A | 8/2017 |
| CN | 107095598 | A | 8/2017 |
| CN | 107148234 | A | 9/2017 |
| CN | 107157356 | A | 9/2017 |
| CN | 107212772 | A | 9/2017 |
| CN | 206453647 | U | 9/2017 |
| CN | 107224225 | A | 10/2017 |
| CN | 107280517 | A | 10/2017 |
| CN | 107303150 | A | 10/2017 |
| CN | 107319965 | A | 11/2017 |
| CN | 107373278 | A | 11/2017 |
| CN | 105682517 | B | 12/2017 |
| CN | 107411477 | A | 12/2017 |
| CN | 107411589 | A | 12/2017 |
| CN | 206688628 | U | 12/2017 |
| CN | 107595164 | A | 1/2018 |
| CN | 206867155 | U | 1/2018 |
| CN | 107713697 | A | 2/2018 |
| CN | 107713825 | A | 2/2018 |
| CN | 105902133 | B | 3/2018 |
| CN | 107788844 | A | 3/2018 |
| CN | 107822529 | A | 3/2018 |
| CN | 107874651 | A | 4/2018 |
| CN | 107912982 | A | 4/2018 |
| CN | 207168385 | U | 4/2018 |
| CN | 107997525 | A | 5/2018 |
| CN | 108013791 | A | 5/2018 |
| CN | 108065810 | A | 5/2018 |
| CN | 108078438 | A | 5/2018 |
| CN | 207341667 | U | 5/2018 |
| CN | 108143312 | A | 6/2018 |
| CN | 207506464 | U | 6/2018 |
| CN | 108272359 | A | 7/2018 |
| CN | 108283444 | A | 7/2018 |
| CN | 207640256 | U | 7/2018 |
| CN | 108378725 | A | 8/2018 |
| CN | 108415344 | A | 8/2018 |
| CN | 108451395 | A | 8/2018 |
| CN | 108471901 | A | 8/2018 |
| CN | 106580132 | B | 9/2018 |
| CN | 108478009 | A | 9/2018 |
| CN | 108577547 | A | 9/2018 |
| CN | 108577597 | A | 9/2018 |
| CN | 108601485 | A | 9/2018 |
| CN | 108606663 | A | 10/2018 |
| CN | 108652478 | A | 10/2018 |
| CN | 108670063 | A | 10/2018 |
| CN | 207940815 | U | 10/2018 |
| CN | 108720603 | A | 11/2018 |
| CN | 108742189 | A | 11/2018 |
| CN | 108903698 | A | 11/2018 |
| CN | 208030887 | U | 11/2018 |
| CN | 109044075 | A | 12/2018 |
| CN | 109091035 | A | 12/2018 |
| CN | 109124296 | A | 1/2019 |
| CN | 305916020 | S | 7/2020 |
| EP | 0676161 | | 7/1998 |
| EP | 3424380 | A1 | 1/2019 |
| GB | 2556646 | A | 6/2018 |
| JP | 1523840 | | 4/2015 |
| JP | 1528172 | S | 7/2015 |
| JP | 1559194 | | 8/2016 |
| JP | 1618973 | | 11/2018 |
| JP | 1618976 | | 11/2018 |
| JP | 1659173 | | 4/2020 |
| KR | 101821786 | | 1/2018 |
| WO | 2008034020 | A1 | 3/2008 |
| WO | 2008095309 | A1 | 8/2008 |
| WO | 2009001244 | A2 | 12/2008 |

(56) References Cited

FOREIGN PATENT DOCUMENTS

| | | |
|---|---|---|
| WO | 2015097606 A3 | 7/2015 |
| WO | 2016165454 A1 | 10/2016 |
| WO | 2017100326 A1 | 6/2017 |
| WO | 2017147059 A1 | 8/2017 |
| WO | 2017153341 A1 | 9/2017 |
| WO | 2017165422 A1 | 9/2017 |
| WO | 2017181838 A1 | 10/2017 |
| WO | 2017211987 A1 | 12/2017 |
| WO | 2018006776 A1 | 1/2018 |
| WO | 2018007831 A1 | 1/2018 |
| WO | 2018014226 A1 | 1/2018 |
| WO | 2018024371 A1 | 2/2018 |
| WO | 2018043872 A1 | 3/2018 |
| WO | 2018071589 A1 | 4/2018 |
| WO | 2018072504 A1 | 4/2018 |
| WO | 2018072505 A1 | 4/2018 |
| WO | 2018075446 A1 | 4/2018 |
| WO | 2018092997 A1 | 5/2018 |
| WO | 2018103312 A1 | 6/2018 |
| WO | 2018115402 A1 | 6/2018 |
| WO | 2018127716 A1 | 7/2018 |
| WO | 2018135697 A1 | 7/2018 |
| WO | 2018148418 A1 | 8/2018 |
| WO | 2018148954 A1 | 8/2018 |
| WO | 2018159958 A1 | 9/2018 |
| WO | 2018186598 A1 | 10/2018 |
| WO | 2018190537 A1 | 10/2018 |
| WO | 2018231103 A1 | 12/2018 |
| WO | 2018234275 A1 | 12/2018 |
| WO | 2019006983 A1 | 1/2019 |
| WO | 2019007920 A1 | 1/2019 |
| WO | 2019010504 A1 | 1/2019 |
| WO | 2019035592 A1 | 2/2019 |
| WO | 2019036486 A1 | 2/2019 |
| WO | 2019030803 A1 | 11/2019 |
| WO | 2019030805 A1 | 11/2019 |

OTHER PUBLICATIONS

International Search Report for International Application No. PCT/US2020/021718 filed Mar. 9, 2020; dated May 19, 2020; 6 pages.
International Search Report for International Application No. PCT/US2020/021719 filed Mar. 9, 2020; dated May 19, 2020; 6 pages.
Japanese Design Application No. 201927097 filed Dec. 6, 2019; Notice of Allowance dated Jun. 12, 2020; 10 pages.
Japanese Design Application No. 201927098 filed Dec. 6, 2019; Notice of Allowance dated Jun. 12, 2020; 10 pages.
Written Opinion for International Application No. PCT/US2020/021718 filed Mar. 9, 2020; dated May 19, 2020; 8 pages.
Written Opinion for International Application No. PCT/US2020/021719 filed Mar. 9, 2020; dated May 19, 2020; 8 pages.
Amazon.com; "Addwin Countertop Blender Professional Commercial Mixer Blender"; Nov. 8, 2018; https://www.amazon.com/dp/B07KBYWB7L/ (Year: 2018); 1 page.
Chinese Application No. 201930680320X filed Dec. 6, 2019; Chinese Office Action with English Translation dated Jul. 23, 2020; 3 pages.
International Search Report for International Application No. PCT/US2020/021728; International Filing Date: Mar. 9, 2020; dated Jul. 16, 2020; 7 pages.
International Search Report for International Application No. PCT/US2020/037484; International Filing Date: Jun. 12, 2020; dated Sep. 22, 2020; 6 pages.
Japanese Application No. 2020-11176 filed Jun. 5, 2020; Notice of Allowance dated Sep. 2, 2020; 6 pages.
U.S. Appl. No. 29/694,049, filed Jun. 6, 2019; Restriction Requirement dated Jul. 29, 2020; 62 pages.
U.S. Appl. No. 29/694,050, filed Jun. 6, 2019; Notice of Allowance dated Jul. 29, 2020; 40 pages.
U.S. Appl. No. 29/740,552, filed Jul. 6, 2020; Restriction Requirement dated Oct. 2, 2020; 8 pages.
U.S. Appl. No. 29/740,562, filed Jul. 6, 2020; Restriction Requirement dated Oct. 2, 2020; 8 pages.
Written Opinion for International Application No. PCT/US2020/021728; International Filing Date: Mar. 9, 2020; dated Jul. 16, 2020; 10 pages.
Written Opinion for International Application No. PCT/US2020/037484; International Filing Date: Jun. 12, 2020; dated Sep. 22, 2020; 8 pages.
Amazon.com; "Vitamix Con A3300 Ascent Series Smart Blender"; Available on amazon.com Jan. 5, 2017; (Year: 2017); https://www.amazon.com/dp/B01MT67Z7B/; 1 page.
U.S. Appl. No. 29/694,050, filed Jun. 6, 2019; Notice of Allowance dated Oct. 29, 2020; 15 pages.
U.S. Appl. No. 29/694,051, filed Jun. 6, 2019; Restriction Requirement dated Dec. 15, 2020; 62 pages.
U.S. Appl. No. 29/740,272, filed Jul. 2, 2020; Restriction Requirement dated Nov. 25, 2020; 7 pages.
International Preliminary Report on Patentability dated Aug. 25, 2021, International Application No. PCT/US2020/021718 filed Mar. 9, 2020 (8 pages).

* cited by examiner

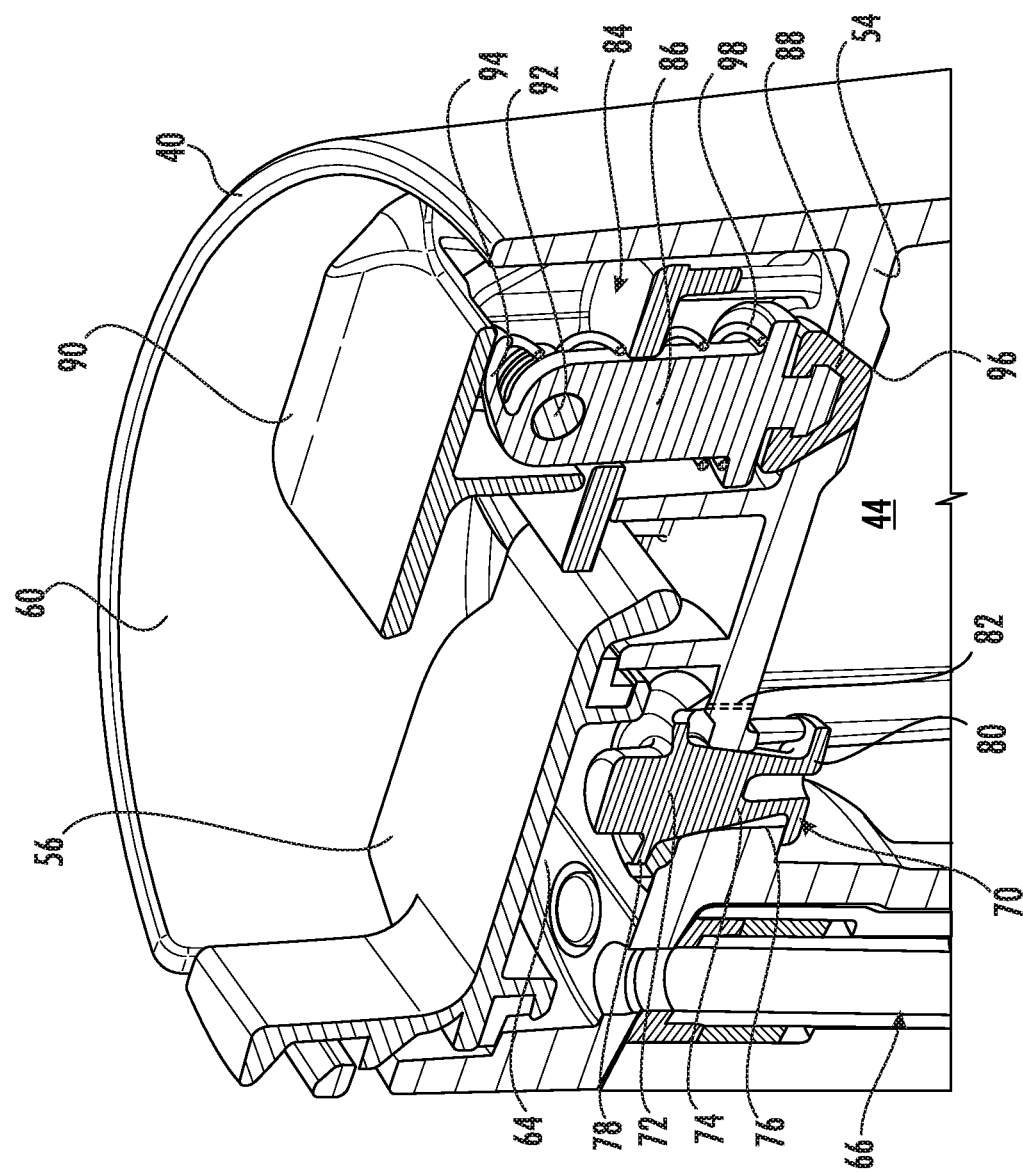

VACUUM FOOD PROCESSING SYSTEM

CROSS-REFERENCE TO RELATED APPLICATIONS

This application is claims priority to U.S. Provisional Application Ser. No. 62/815,992, filed Mar. 8, 2019, the entire contents of which are incorporated herein by reference.

BACKGROUND

Exemplary embodiments of the present invention relate to a blender, and more particularly to a container of a blender configured to receive one or more food items therein.

Blenders are commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

Several benefits can be achieved by forming a vacuum within a blender container or attachment either prior to or after a blending operation. For example, by forming a vacuum prior to a blending operation, the overall degradation of the nutritional properties of the ingredients being processes may be reduced. Accordingly, a blender container or attachment may include a seal that is movable to selectively form a vacuum within the blender container. However, when the blender container is used in high vibration environments, such as in a vehicle or when the container is being carried in a bag for example, it is possible that liquid or other ingredients from the interior of the blender container may leak through the seal.

SUMMARY

According to an embodiment, a container assembly for a food processing system having a sealable body including a chamber having an open end and an accessory connectable to said open end of said chamber. The accessory includes a body including an opening and a member configurable with said opening to selectively seal said opening. The opening is sealed by said member. The accessory is receivable within a base of the food processing system.

In addition to one or more of the features described above, or as an alternative, in further embodiments said member is rotatable about an axis between a first position and a second position.

In addition to one or more of the features described above, or as an alternative, in further embodiments rotation of said member between said first position and said second position is out of a plane including said opening.

In addition to one or more of the features described above, or as an alternative, in further embodiments rotation of said member between said first position and said second position is within a plane including said opening.

In addition to one or more of the features described above, or as an alternative, in further embodiments said member is translatable between a first position and a second position.

In addition to one or more of the features described above, or as an alternative, in further embodiments said member includes a sealing element complementary to said opening and when said member is in said second position, said sealing element is associated with said opening.

In addition to one or more of the features described above, or as an alternative, in further embodiments association between said sealing element and said opening forms an air-tight seal.

In addition to one or more of the features described above, or as an alternative, in further embodiments said container assembly further comprises a vacuum passage integral with said sealable body.

In addition to one or more of the features described above, or as an alternative, in further embodiments said accessory is receivable within a base of the food processing system, said vacuum passage is arranged in fluid communication with a vacuum system of the base.

In addition to one or more of the features described above, or as an alternative, in further embodiments said sealable body includes a second end having at least one vacuum opening, and said container assembly further comprises a vacuum sealing assembly movable relative to said at least one vacuum opening to fluidly couple said second end and said chamber.

In addition to one or more of the features described above, or as an alternative, in further embodiments comprises a release mechanism operable to selectively fluidly couple said chamber to an ambient atmosphere.

In addition to one or more of the features described above, or as an alternative, in further embodiments said accessory is a to-go lid.

In addition to one or more of the features described above, or as an alternative, in further embodiments said accessory is a rotatable blade assembly.

According to another embodiment, a food processing system includes a food processor base including a rotary component and a vacuum system. An attachment configured for removable association with said food processor base includes a sealable body including a chamber having an open end and an accessory coupled to said open end of said chamber The accessory has a sealable opening formed therein, the accessory being receivable within the food processor base.

In addition to one or more of the features described above, or as an alternative, in further embodiments said accessory further comprises: a body including said sealable opening and a member movable relative to said body between a first position and a second position to selectively seal said sealable opening.

In addition to one or more of the features described above, or as an alternative, in further embodiments said member is rotatable about an axis between said first position and said second position.

In addition to one or more of the features described above, or as an alternative, in further embodiments rotation of said member between said first position and said second position is out of a plane including said opening.

In addition to one or more of the features described above, or as an alternative, in further embodiments rotation of said member between said first position and said second position is within a plane including said opening.

In addition to one or more of the features described above, or as an alternative, in further embodiments said member is translatable between said first position and said second position.

In addition to one or more of the features described above, or as an alternative, in further embodiments said member includes a sealing element complementary to said sealable opening and when said member is in said second position, said sealing element is engaged with said sealable opening.

In addition to one or more of the features described above, or as an alternative, in further embodiments said container assembly further comprises a vacuum passage integral with said sealable body.

In addition to one or more of the features described above, or as an alternative, in further embodiments when said accessory is received within said food processor base, said vacuum passage is arranged in fluid communication with a vacuum system of the base.

In addition to one or more of the features described above, or as an alternative, in further embodiments said accessory is not connectable to said rotary component.

In addition to one or more of the features described above, or as an alternative, in further embodiments said accessory is connectable to said rotary component.

In addition to one or more of the features described above, or as an alternative, in further embodiments said sealable body includes a second end having at least one vacuum opening, and said attachment further comprises a vacuum sealing assembly movable relative to said at least one vacuum opening to fluidly couple said second end and said chamber.

In addition to one or more of the features described above, or as an alternative, in further embodiments comprises a release mechanism operable to selectively fluidly couple said chamber to an ambient atmosphere.

In addition to one or more of the features described above, or as an alternative, in further embodiments said accessory is a to-go lid.

In addition to one or more of the features described above, or as an alternative, in further embodiments said accessory is a rotatable blade assembly.

According to yet another embodiment, an accessory for use with a food processing includes a body positionable within a base of the food processing system. The body has a first side and a second side and an opening formed therein. A processing element is arranged at a first side of the body and a member configurable with said opening to selectively seal said opening is arranged at said second side of said body.

In addition to one or more of the features described above, or as an alternative, in further embodiments the processing element includes a rotatable blade assembly.

According to yet another embodiment, an accessory for use with a container of a food processing system includes a body positionable within a base of the food processing system, said body having a first side and a second side. An opening is formed in said body and a member configurable with said opening is operable to selectively seal said opening. The member is arranged at said second side of said body. A vacuum sealing assembly for sealing a chamber of the container, and a release mechanism operable to fluidly couple said chamber to an ambient atmosphere.

In addition to one or more of the features described above, or as an alternative, in further embodiments said release mechanism is operably coupled to said vacuum sealing assembly.

In addition to one or more of the features described above, or as an alternative, in further embodiments said release mechanism is integrally formed with said vacuum sealing assembly.

In addition to one or more of the features described above, or as an alternative, in further embodiments said member is rotatable about an axis between said first position and said second position.

In addition to one or more of the features described above, or as an alternative, in further embodiments said member includes a sealing element complementary to said sealable opening and when said member is in said second position, said sealing element is engaged with said sealable opening.

In addition to one or more of the features described above, or as an alternative, in further embodiments said release mechanism is operable to selectively fluidly couple said chamber to said ambient atmosphere when said sealing element is engaged with said sealable opening.

BRIEF DESCRIPTION OF THE FIGURES

The accompanying drawings incorporated in and forming a part of the specification embodies several aspects of the present invention and, together with the description, serves to explain the principles of the invention. In the drawings:

FIG. 5A is a detailed perspective cross-sectional view of a second end of the container body of FIG. 5 according to an embodiment;

The detailed description explains embodiments of the invention, together with advantages and features, by way of example with reference to the drawings.

DETAILED DESCRIPTION

Figure 1:
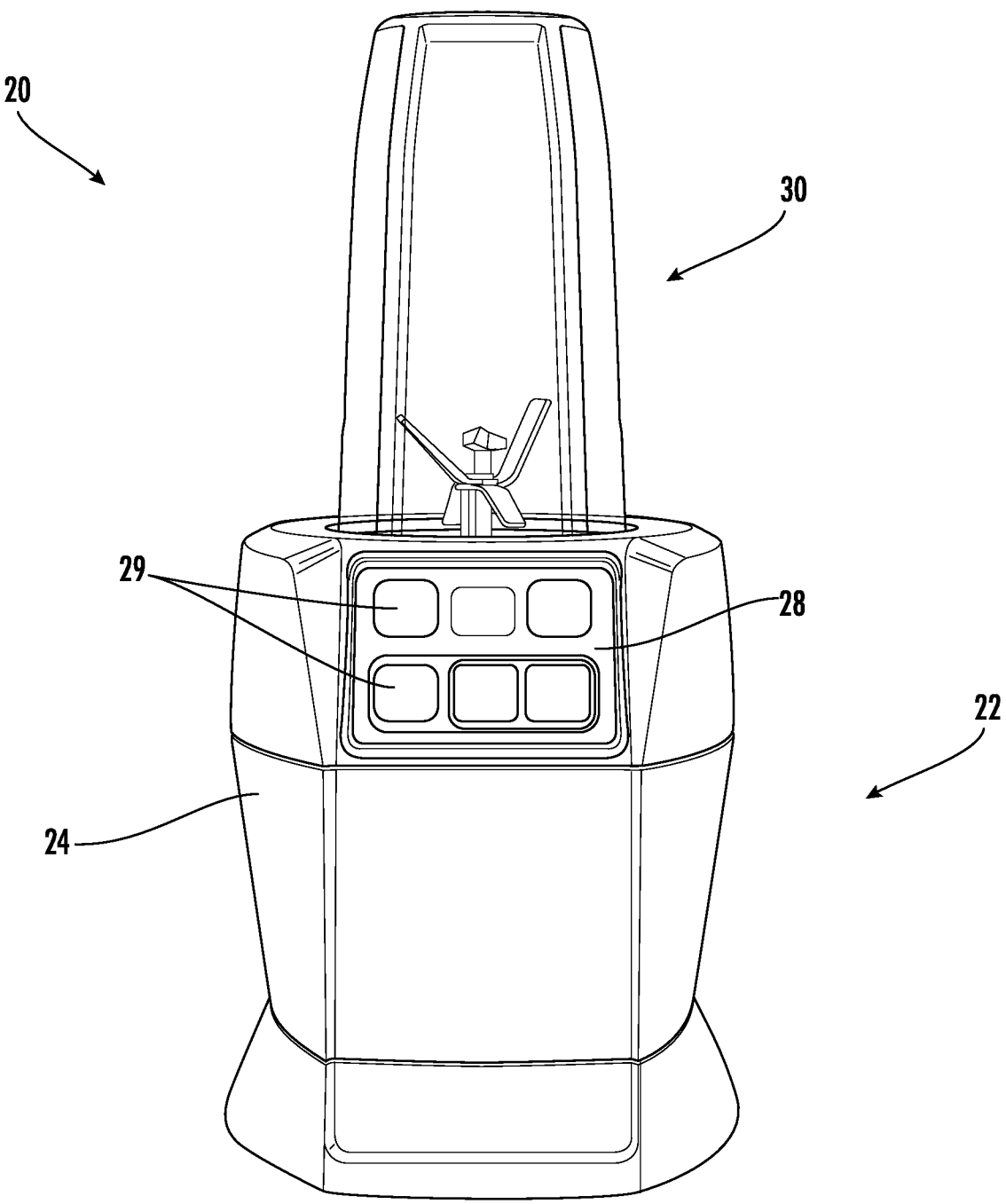
FIG. 1 is a perspective view of an example of a food processing system.
Figure 2:
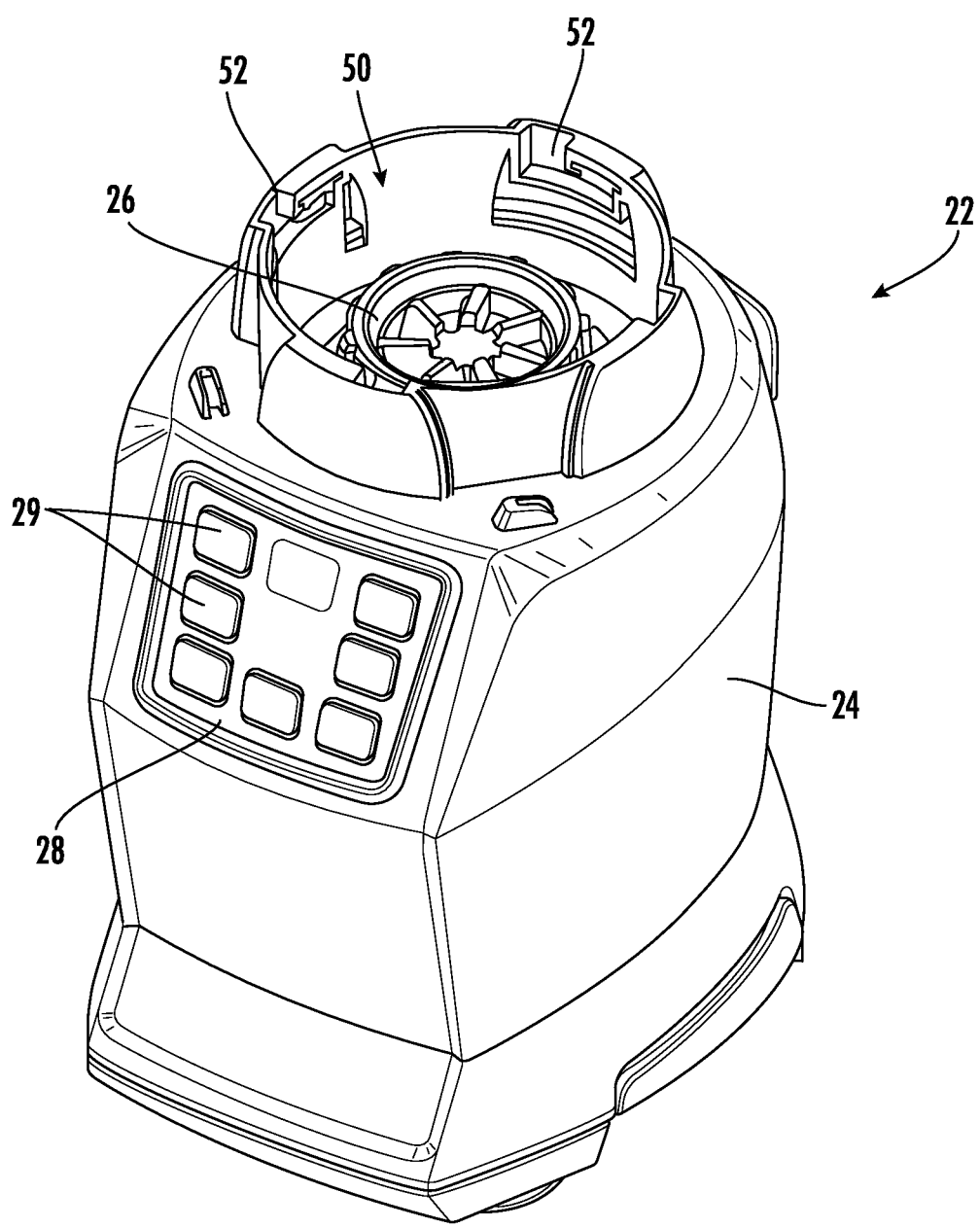
FIG. 2 is a perspective view of a base of a food processing system.

Referring now to FIGS. 1 and 2, an example of a multi-functional food processing system 20 is illustrated. In general, the food processing system 20 can be adapted to perform any food processing or blending operation including as non-limiting examples, dicing, chopping, cutting, slicing, mixing, blending, stirring, crushing, or the like. Although the food processing system 20 illustrated and described herein is a personal blender system, other food processing systems are within the scope of the present disclosure.

Figure 9:
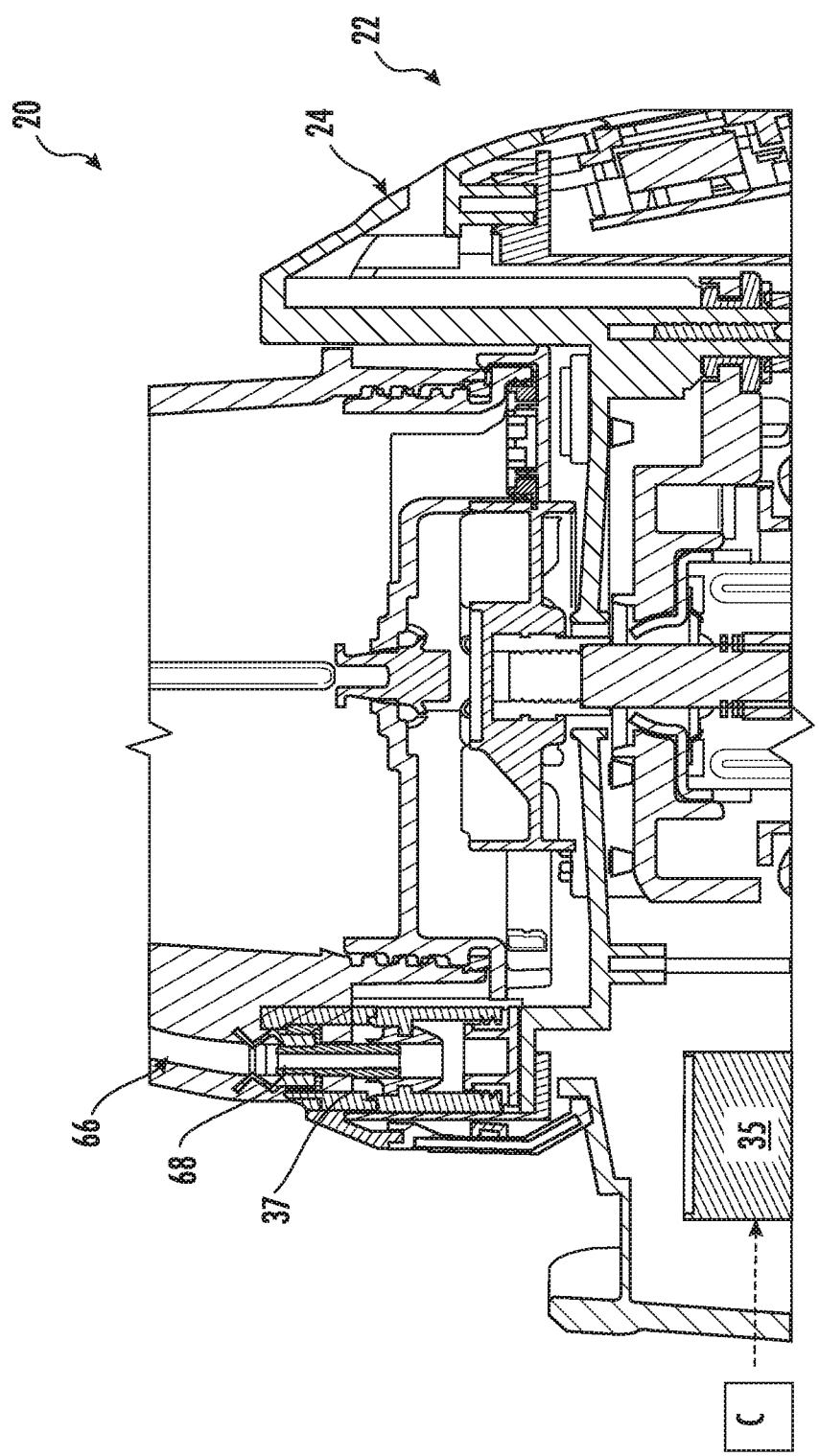
FIG. 9 is a cross-sectional view of an attachment coupled to a base of a food processing system according to an embodiment.

The food processing 20 system includes a base 22 having a body or housing 24 within which a motorized unit (not shown) and at least one controller C (see FIG. 9) are located. The base 22 includes at least one rotary component, such as a drive coupler 26 (see FIG. 2) for example, driven by the motorized unit located within the housing 24. The base 22 additionally includes a control panel or user interface 28 having one or more inputs 29 for turning the motorized unit on and off and for selecting various modes of operation, such as pulsing, blending, or continuous food processing. The at least one drive coupler 26 is configured to engage a portion of an attachment 30 coupled to the base 22 for the processing of food products located within an interior of the attachment 30. This will become more apparent in subsequent FIGS. and discussion.

In an embodiment (see FIG. 9), the base 22 of the food processing system 20 additionally includes vacuum system 32 having a mechanism 34 capable of drawing a vacuum, such as a vacuum pump for example. However, any mechanism capable of drawing a vacuum is contemplated herein. At least one attachment 30 configured for use with the base 22 is operably coupled to the vacuum pump 34 when the attachment 30 is mounted to the base 22. In the illustrated, non-limiting embodiment, the vacuum pump 34 is arranged at a side 35 of the base 22, such as at the rear thereof, to allow one or more attachments having varying configurations to easily couple to the vacuum pump 34. The vacuum pump 34 may be operably coupled to the controller, illustrated schematically at C, such that the vacuum pump 34 is operated by the controller C in response to actuation of one or more inputs 29 of the user interface 28.

Figure 3:
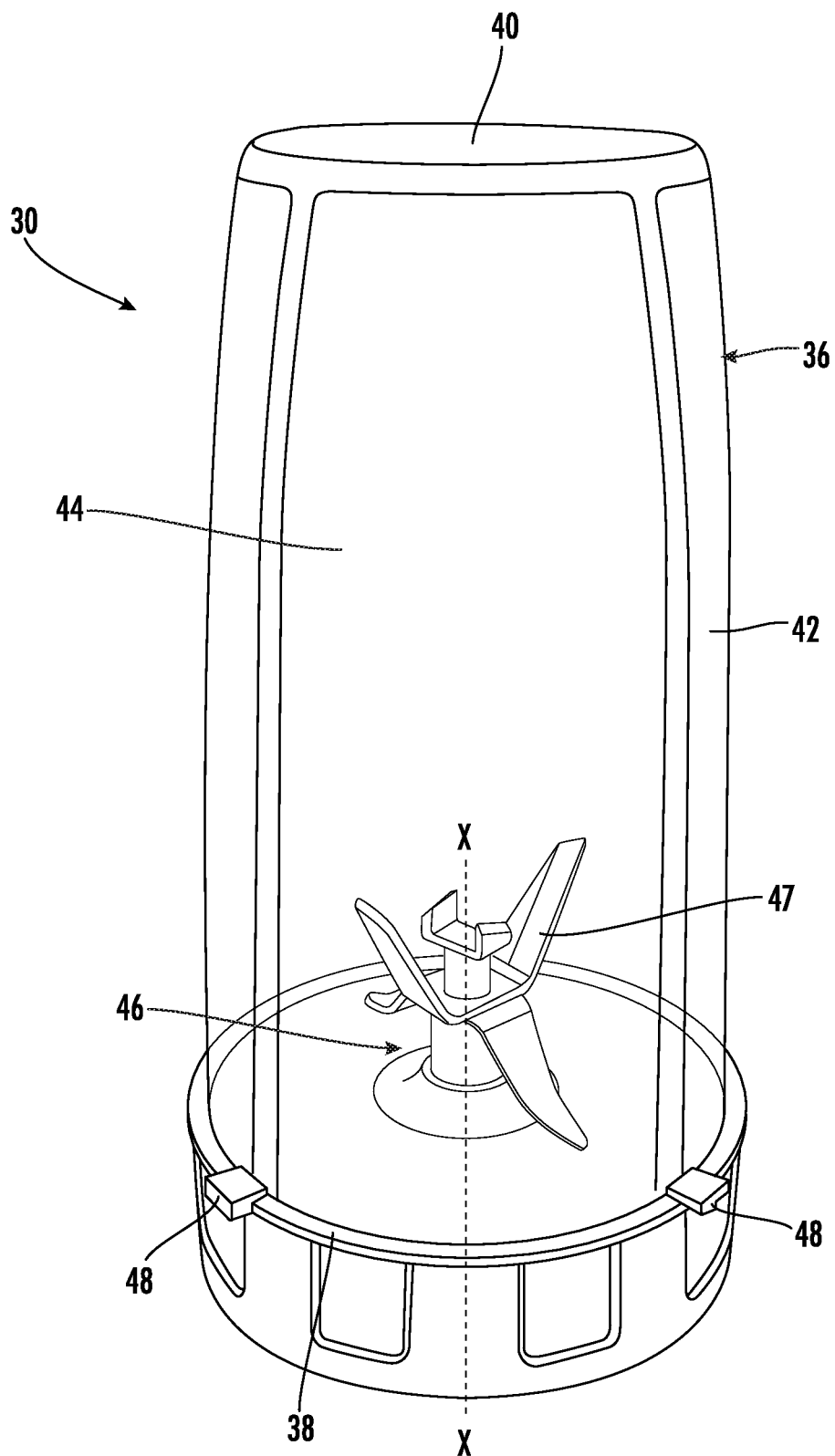
FIG. 3 is a perspective view of a food processing system having a first attachment.
Figure 4:
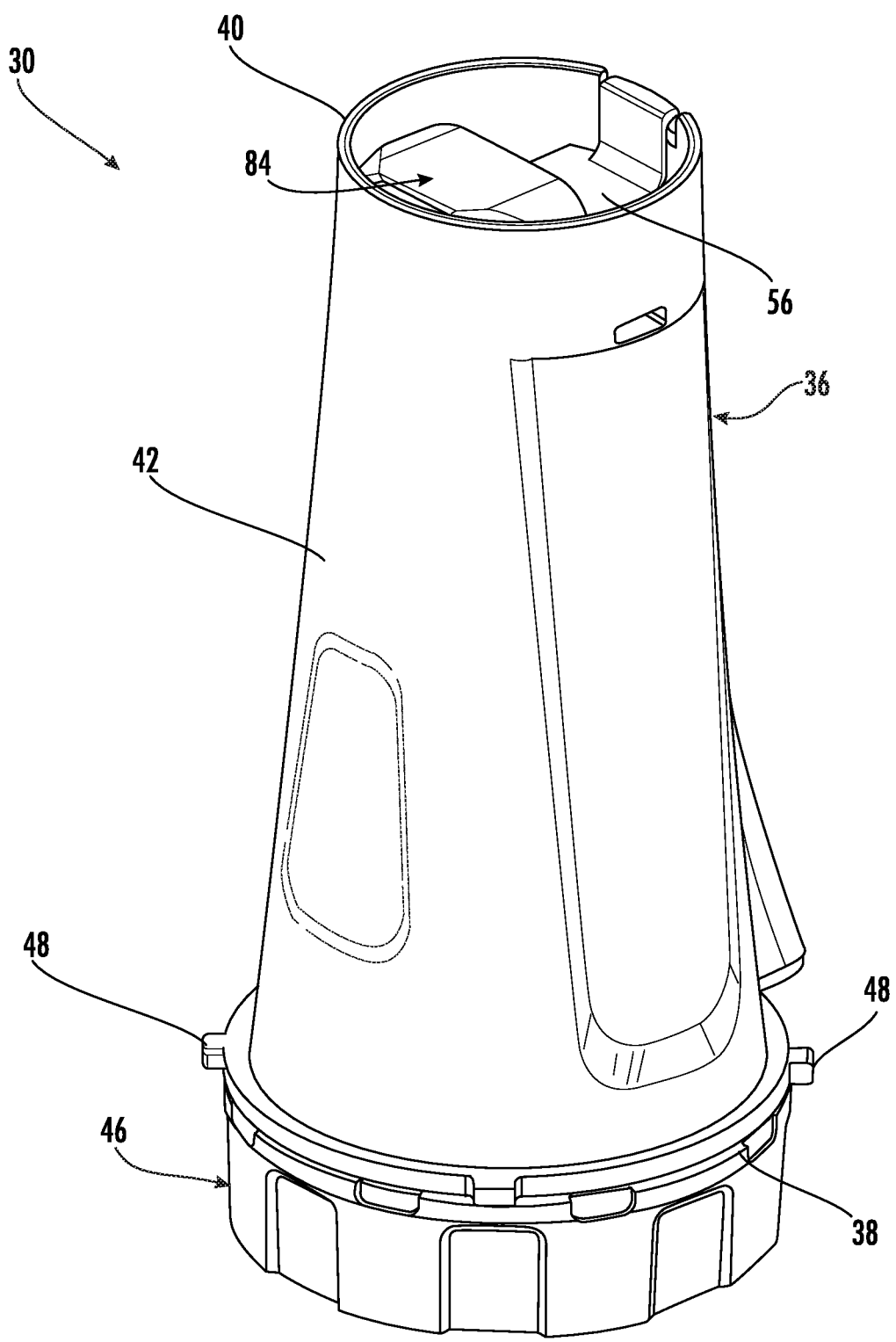
FIG. 4 is a perspective view of an attachment suitable for use with a food processing system.

One or more attachments 30 varying in size and/or functionality may be configured for use with the base 22. An example of an attachment is illustrated in more detail in FIG. 3. In an embodiment, the attachment 30 includes an inverted jar or container having a body 36 including a first open end 38, a second closed end 40, and one or more sidewalls 42 extending between the first end 38 and the second end 40 to define a hollow processing chamber 44 of the container. The attachment 30 is a personal blending container that has a first configuration when separated from the base 22 and a second, inverted configuration when coupled to the base 22. A rotatable blade assembly 46 is configured to selectively couple to the first open end 38 of the container 36 to seal the processing chamber 44. The container 36 and blade assembly 46 may be threadably coupled together; however, it should be understood that other mechanisms for removably connecting the container 36 and the blade assembly 46 are also contemplated herein.

To process the food items arranged within the processing chamber 44 of the container 36, the rotatable blade assembly 46 is coupled to the first end 38 of the container 36. When connected to the container 36, the rotatable blade assembly 46 is configured to couple to the base 22 of the food processing system 20. A driven coupler (not shown) associated with the at least one blade 47 is positioned adjacent an external surface of the rotatable drive assembly 46, outside of the chamber 44. The at least one drive coupler 26 is configured to engage the driven coupler to rotate the at least one blade 47 about an axis X to process the food products located within the processing chamber 44 of the attachment 30. It should be understood that the attachment 30 including an inverted container 36 and a rotatable blade assembly 46 is intended as an example only, and that other attachments such as attachments having the same orientation when both connected to the base 22 and separated therefrom, are also contemplated herein.

In embodiments where the attachment 30 is an inverted container 36, the attachment 30 may include one or more contact members 48, such as tabs for example, positioned about the periphery of the attachment 30. Although four contact members 48 are generally illustrated in the FIGS., any number of contact members 48 is within the scope of the disclosure. In embodiments where the attachment 30 includes an inverted container 36 and a blade assembly 46, the contact members 48 may extend outwardly from the container 36, the blade assembly 46, or both.

The contact members 48 of the attachment 30 are configured to cooperate with a mounting area 50 of the base 22 to couple the attachment 30 to the base 22. As shown, the mounting area 50 includes one or more receiving slots 52 within which each of the plurality of contact members 48 of the attachment 30 is receivable. The attachment 30 may be configured to slidably connect to the base 22 of the food processing system 20. Alternatively or in addition, the attachment 30 may be configured to rotatably connect to the base 22 such that the attachment 30 is locked relative to the base 22. However, it should be understood that any suitable mechanism for coupling the attachment to the base 22 is within the scope of the disclosure.

In an embodiment, the container 36 is a vacuum container suitable for performing a vacuum operation of the food processing system 20. In such embodiments, the container 36 includes an interior wall 54 disposed at a position located between the first end 38 and the second end 40 of the container 36. In the illustrated, non-limiting embodiment, the interior wall 54 is offset from the second end 40 of the container 36 and seals an end of the processing chamber 44. A cover 56 is vertically offset from the interior wall 54, at a position between the interior wall 54 and the second end 40 of the container 36. The cover 56 may be permanently affixed to the container 36, or alternatively, may be able to move, for example pivot, relative to the interior wall 54 between a closed position and an open position. In an embodiment, the cover 56 extends from a protrusion 58 located at a central portion of the interior wall 54 to an interior surface 60 of the sidewall 42. A gasket or seal 62 may be mounted to the cover 56 and configured to contact the interior surface 60 of the sidewall 42 and the interior wall 54 to form an air-tight seal there between. Together the interior wall 54, adjacent sidewall 42, and cover 56 cooperate to define a vacuum chamber 64 sealed from the ambient atmosphere and separate from the processing chamber 44.

Figure 5:
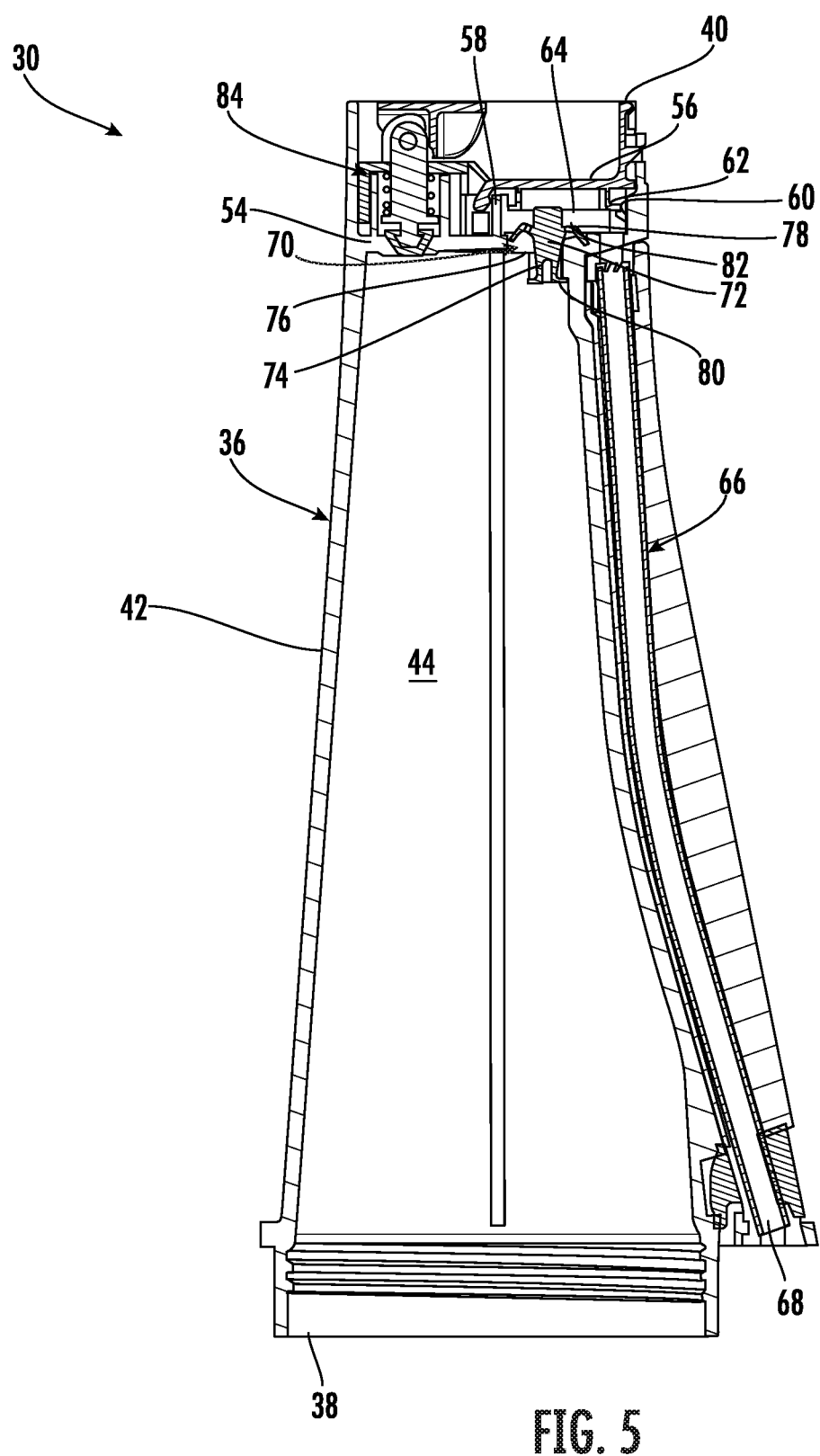
FIG. 5 is a cross-sectional view of the container body of FIG. 4 according to an embodiment.
Figure 6:
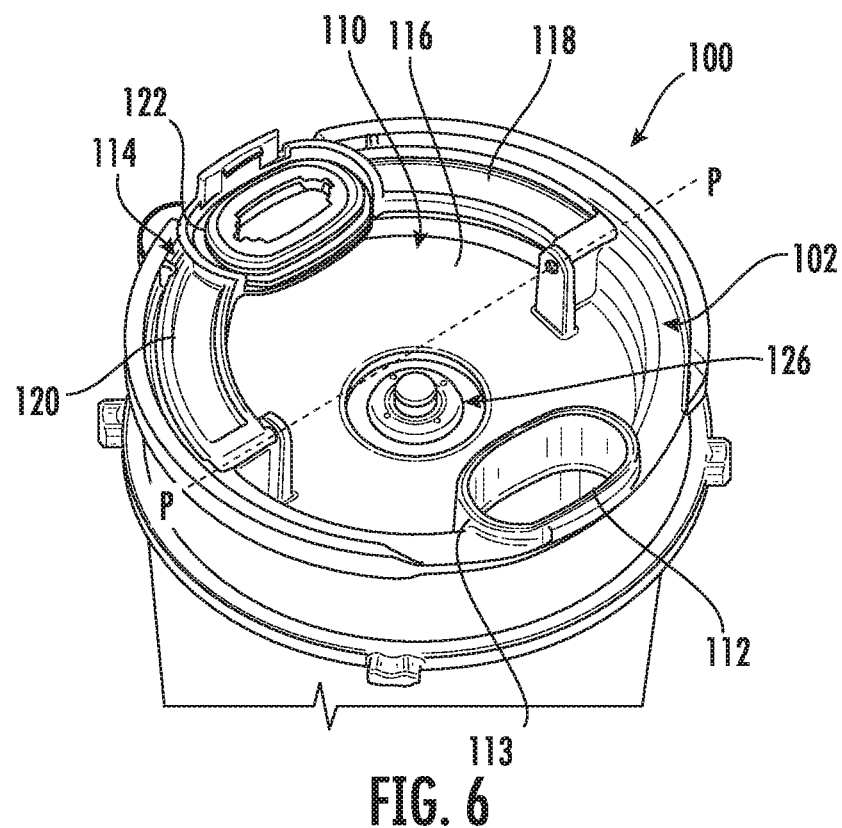
FIG. 6 is a perspective view of an accessory of an attachment suitable for use with a food processing system according to an embodiment.

The container 36 additionally includes a vacuum passage or conduit 66 configured to fluidly connect the vacuum pump 34 and the vacuum chamber 64 when the attachment 30 is coupled to the base 22. The vacuum passage 66 may have a generally linear configuration as shown in FIG. 5, or alternatively, may have one or more bends or angles formed therein. Because the vacuum pump 34 is located at a side 35 of the base 22, a first end 68 of the vacuum passage 66 configured to abut with a surface of the base 22 to fluidly couple to the vacuum pump 34 is similarly located adjacent a corresponding side of the container 36. In an embodiment, a portion of the vacuum system 32 is arranged adjacent an upper surface 37 of the base 22. As a result, the first end 68 of the vacuum passage 66 may be vertically offset from the first end 38 of the container 36. However, embodiments where the first end 68 of the vacuum passage 66 is aligned with the first end 38 of the container 36 are also considered herein.

The vacuum attachment 30 includes a vacuum sealing assembly 70 located within the vacuum chamber 64, at an interface between the processing chamber 44 and the vacuum chamber 64. As best shown in FIG. 5, an example of a vacuum sealing assembly 70 is illustrated in more detail. More specifically, the vacuum sealing assembly 70 may be formed in the interior wall 54 that separates the processing chamber 44 from the vacuum chamber 64. By arranging the vacuum sealing assembly 70 at this position, the vacuum sealing assembly 70 is easily accessible by a user when the attachment 30 is coupled to the base 22 of the food processing system 20. However, in other embodiments, the vacuum sealing assembly 70 may be located at another location about the attachment 30.

The vacuum sealing assembly 70, best shown in FIG. 5A, includes an umbrella valve 72 having a valve stem 74 extending through a primary chamber opening 76 formed in the interior wall 54, and a flange 78 extending generally perpendicular to the valve stem 74. As shown, one or more dimensions of the distal end 80 of the valve stem 74 are greater than the primary chamber opening 76 to restrict movement of the umbrella valve 72 relative to the container 36. Via the engagement between the valve stem 74 and the primary chamber opening 76, a flow of fluid or food particles from the interior processing chamber 44 of the container 36 through the primary chamber opening 76 is restricted. The flange 78 of the umbrella valve 72 is sized such that a portion of the flange 78, such as near the periphery of the flange 78 for example, is in overlapping arrangement with the at least one secondary chamber opening 82 formed in the interior wall 54. Accordingly, under normal conditions, the flange 78 seals the at least one secondary opening 82 to prevent a flow of fluid and/or food particles there through.

During a vacuum operation, when either attachment is mounted to the base 22 and the vacuum passage 66 is operably coupled to the vacuum system 32, the vacuum mechanism 34 generates a negative pressure which is applied to the exposed surface of the umbrella valve 72. The negative pressure generated will cause the peripheral portion of the flange 78 to separate from the secondary chamber opening 82 just enough to allow air within the processing chamber 44 to be drawn there through. As soon as operation of the vacuum mechanism 34 ceases and the negative pressure is removed, the peripheral portion of the flange 78 will bias back into its original position to seal the secondary chamber opening 82. This bias may be the result of the resilient material, such as silicone for example, from which the umbrella valve 72 is formed. Alternatively, a biasing mechanism may be used to facilitate movement of the flange 78 back into a sealing position. A vacuum operation may be performed after food has been disposed within the processing chamber 44 but prior to performing a food processing operation. In another embodiment, a vacuum operation is initiated to draw a vacuum within the processing chamber 44 after performance of a food processing operation has been performed. Forming a vacuum after a blending operation may be used to increase the shelf life or storage of the food products within the attachment 30.

The vacuum attachment 30 additionally includes a release mechanism 84 operable to vent the processing chamber 44 of the container 36 to ambient, thereby breaking the vacuum formed therein. The release mechanism 84 is similarly mounted at a location of the attachment 30 that is easily accessible by a user. As shown, the release mechanism 84 is located remotely from and is not connected to the vacuum sealing assembly 70. However, it should be understood that embodiments where the release mechanism 84 is directly or indirectly coupled to the vacuum sealing assembly 70 are also within the scope of the disclosure. With respect to the inverted vacuum jar, the release mechanism 84 is mounted at the exposed second end 40 of the container 36.

An example of a release mechanism 84 is shown in more detail in FIG. 5A. In the illustrated, non-limiting embodiment, the release mechanism 84 includes a connector 86 having a sealing member 88. The release mechanism 84 additionally includes an actuator 90 pivotally coupled to the connector 86 via a pin 92 defining a pivot axis of the actuator 90. In an embodiment, a camming lever 94 extends from the connector 86 toward the actuator 90. When the release mechanism 84 is in an unactuated state, the sealing member 88 is engaged with an adjacent opening 96 fluidly connected to the processing chamber 44. A biasing member 98, such as a coil spring for example, may be coupled to the connector 86 to bias the sealing member 88 into engagement with the opening 96 to form an air tight and liquid tight seal. To actuate the release mechanism 84, the actuator 90 is pivoted about the axis of pin 92. This movement overcomes the bias of the biasing member 98 and also applies a force to the camming lever 94 of the connector 86, thereby causing the connector 86 and sealing member 88 to move vertically, and out of engagement with the opening 96.

After a vacuum has been generated within the processing chamber 44 of the container 36, it is difficult, if not impossible to remove the blade assembly 46 and access the food product within the processing chamber 44 as a result of the forces acting thereon. Accordingly, a user should first break the vacuum within the container 36 by operating the release mechanism 84 prior to accessing the contents within the processing chamber 44 of the container 36.

A container 36 having a vacuum sealing assembly 70 as illustrated and described herein when used in conjunction with a vacuum device 34 prior to a food processing operation may provide a food product having increased vitamin retention, specifically vitamin C. Exposure to oxygen within during the blending process may cause the ingredients within the container 36 to degrade. By removing the oxygen from the container 36, the overall degradation of the nutritional properties of the ingredients being processes is reduced. The vacuum attachment 30 illustrated and described herein is intended as an example only, and it should be understood than any vacuum attachment suitable for use with the base 22 is within the scope of the disclosure.

In an embodiment, other accessories interchangeable with the rotatable blade assembly 46, such as a lid or cover for example, may be removably coupled to the first open end 38 of the container 36 to seal the container 36. An example of such an accessory 100 suitable for use with a vacuum attachment is illustrated in more detail in FIGS. 6-12. As shown, the accessory 100 includes a body 102 having a first end 104, a second end 106, and a sidewall 108 extending between the first end 104 and the second end 106. In the illustrated, non-limiting embodiment, the body 102 is sealed by a wall 110, at least a portion of which is arranged at a position offset from the first end 104. In other embodiments, the first end 104 of the body 102 may be sealed, or alternatively, the second end 106 of the body 102 may be sealed.

An opening 112, such as for consuming the food product within the processing chamber 44 for example, is formed in a portion of the body 102. In the illustrated, non-limiting embodiment, the opening 112 is formed in the wall 110. Because the wall 110 is offset from the first end 104 of the body 102, a channel wall 113 may protrude from the wall 110 to the plane of the first end 104 to define a passage of the opening 112. However, the opening 112 may be formed at any position about the body 102. Although in the illustrated, non-limiting embodiment, the channel wall 113 and the wall 110 are integrally formed, embodiments where the channel wall 113 and the wall 110 are distinct are also within the scope of the disclosure.

Figure 7:
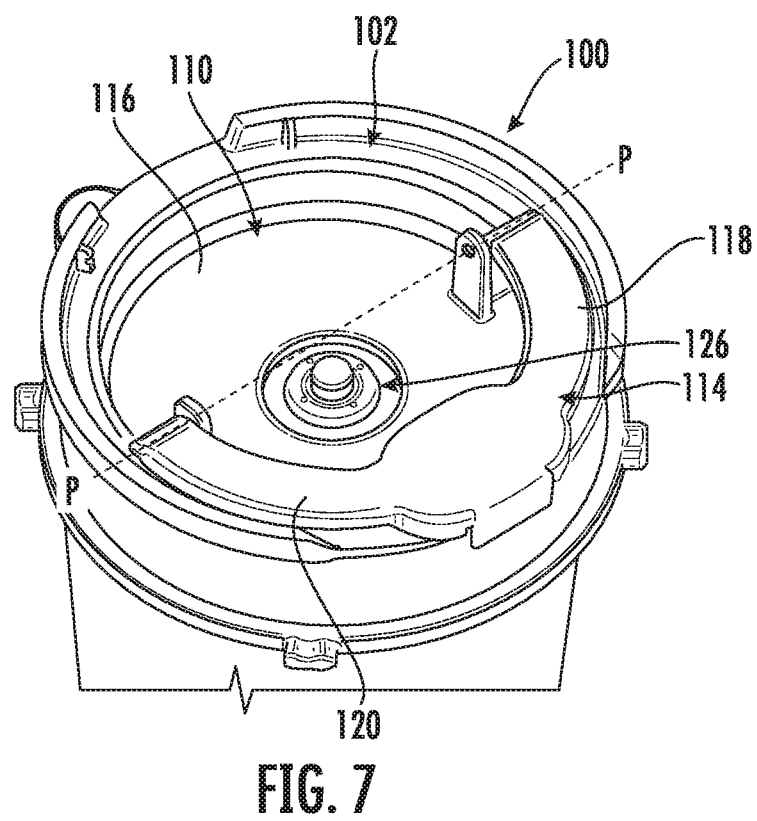
FIG. 7 is a perspective view of an accessory of an attachment suitable for use with a food processing system according to an embodiment.
Figure 8:
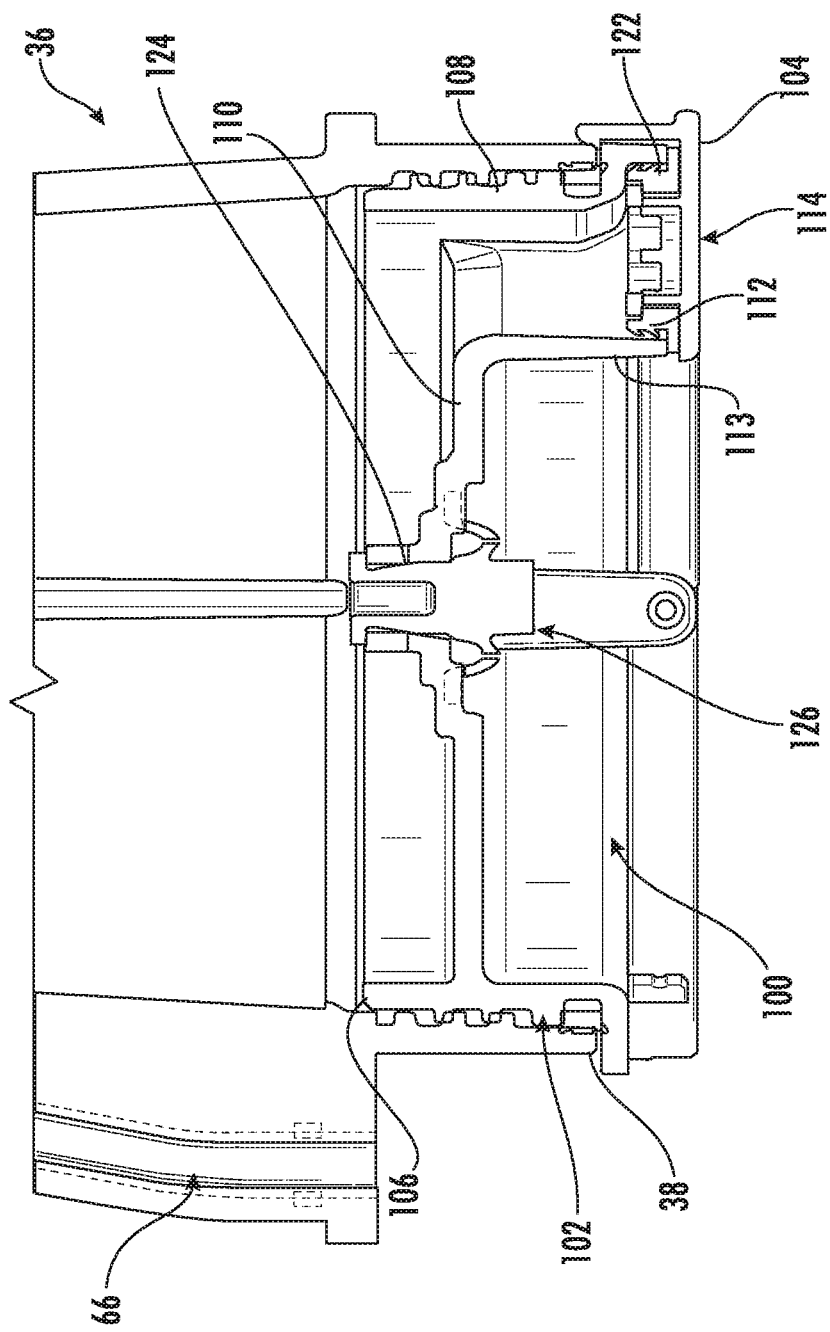
FIG. 8 is a cross-sectional view of an attachment suitable for use with a food processing system according to an embodiment.

The accessory 100 additionally includes a movable member 114 operable to selectively seal the opening 112. In the illustrated, non-limiting embodiment, the movable member 114 is a flip top pivotable about an axis P oriented generally perpendicular to the axis defined by the opening 112, such that the movable member 114 rotates out of the plane of the opening 112. As shown, the movable member 114 is transformable between a first, open position (FIG. 6), and a second, closed position (FIG. 7). The open positon and the closed position of the movable member 114 may, but need not be generally coplanar, and in an embodiment, the rotation about the axis P between the open and closed positions is less than or equal to about 180 degrees. However, embodiments where the open and closed positions are separated by a different angle, including but not limited to any angle between 20-180 degrees is within the scope of the disclosure. Further, although the movement of the movable member 114 is illustrated as out of plane relative to the opening 112, embodiments where the movable member 114 is configured to rotate or translate within the plane of the opening 112 are also contemplated herein.

In an embodiment, the movable member 114 is mounted to at least one of an upper surface 116 of the wall 110 and the first end 104 of the body 102. However, it should be understood that embodiments where the movable member 114 is mounted at any suitable position of the accessory 100 for selective engagement with the opening 112 is within the scope of the disclosure. Alternatively, or in addition, the movable member 114 may be removably coupled to the accessory 100 via the opening 112 or the structure of the body 102 surrounding the opening 112. In the illustrated, non-limiting embodiment, the movable member 114 has an arcuate body including a first arm 118 and a second arm 120 pivotally mounted for rotation about the axis P. However, other configurations of the movable member 114 are also contemplated herein.

In an embodiment, the movable member 114 includes a sealing element 122 (FIG. 6) having a configuration generally complementary to the opening 112. The sealing element 122 is configured to abut or engage a surface defining the opening 112 to form an air-tight seal therewith. Accordingly, when the flip top 114 is arranged in a first open position, shown in FIG. 6, the movable member 114 and sealing element 122 are separated from the opening 112, thereby allowing a user to access the opening 112. When the movable member 114 is in the second, closed position, the sealing element 122 is arranged within and seals the opening 112, thereby restricting a flow there through.

In an embodiment, the accessory 100 includes an opening 124 having a vacuum sealing assembly 126 including an umbrella valve similar to the vacuum sealing assembly 70 arranged adjacent the second closed end 40 of the container 36. Although the opening 124 is shown as being formed in a portion of the wall 110, such as remote from the channel wall 113 for example, an opening 124 formed at any location in fluid communication with the processing chamber 44 of the container 36 when the accessory is connected to the container 36 is contemplated herein. However, it should be understood that embodiments where the to go lid does not include a vacuum sealing assembly 126 are also within the scope of the disclosure.

In an embodiment, a vacuum operation to remove the air from the processing chamber 44 of the container 36 may be performed while the accessory 100 is affixed to the first open end 38 of the container 36. As previously described, the first end 38 of the container 36 and the accessory 100 are configured to couple to the base 22 of the food processor system 20. In such an inverted configuration, the movable member 114 is in the second closed position such that the opening 112 is sealed, thereby preventing any of the food items within the processing chamber 44 from escaping through the opening 112. In the illustrated, non-limiting embodiment, the body 102 of the accessory 100 is configured such that when the container 36 and accessory 100 are installed onto the base 22, the drive coupler 26 is located within the clearance formed between the first end 104 of the body 102 of the accessory 100 and the wall 110. By performing a vacuum operation when the accessory 100 is connected to the container 36, a user is able to take the container 36 having a negative pressure processing chamber 44 on the go, i.e. separate from the food processor so that a user may selectively break the vacuum when the user is ready to consume the contents of the processing chamber 44 at a later time.

In an embodiment, the accessory 100 is attached to the first end 38 of the container 36 after all processing, i.e. blending, chopping, pureeing etc, of the food items within the processing chamber 44 is completed. Accordingly, in such embodiments, an accessory 100 including a processing element, such as the rotatable blade assembly 46 for example, is removed from the container 36 and the accessory 100 is then attached thereto. Accordingly, the rotatable blade assembly 46 and the accessory 100 may be interchangeable relative to the container 36. However, in other embodiments, an accessory including a processing element may also have an opening 112 formed therein and a movable member 114 operable to selectively seal the opening 112. In such embodiments, the processing element may be disposed adjacent a first side of the accessory body, for insertion into the processing chamber, and the movable member may be arranged adjacent a second side of the accessory, such as an opposite side that is typically exposed to a user. Accordingly, in some instances a single accessory may be used not only to process the food, but also as a to-go lid for storing the processed food within the processing chamber 44 for consumption at another time.

Figure 10:
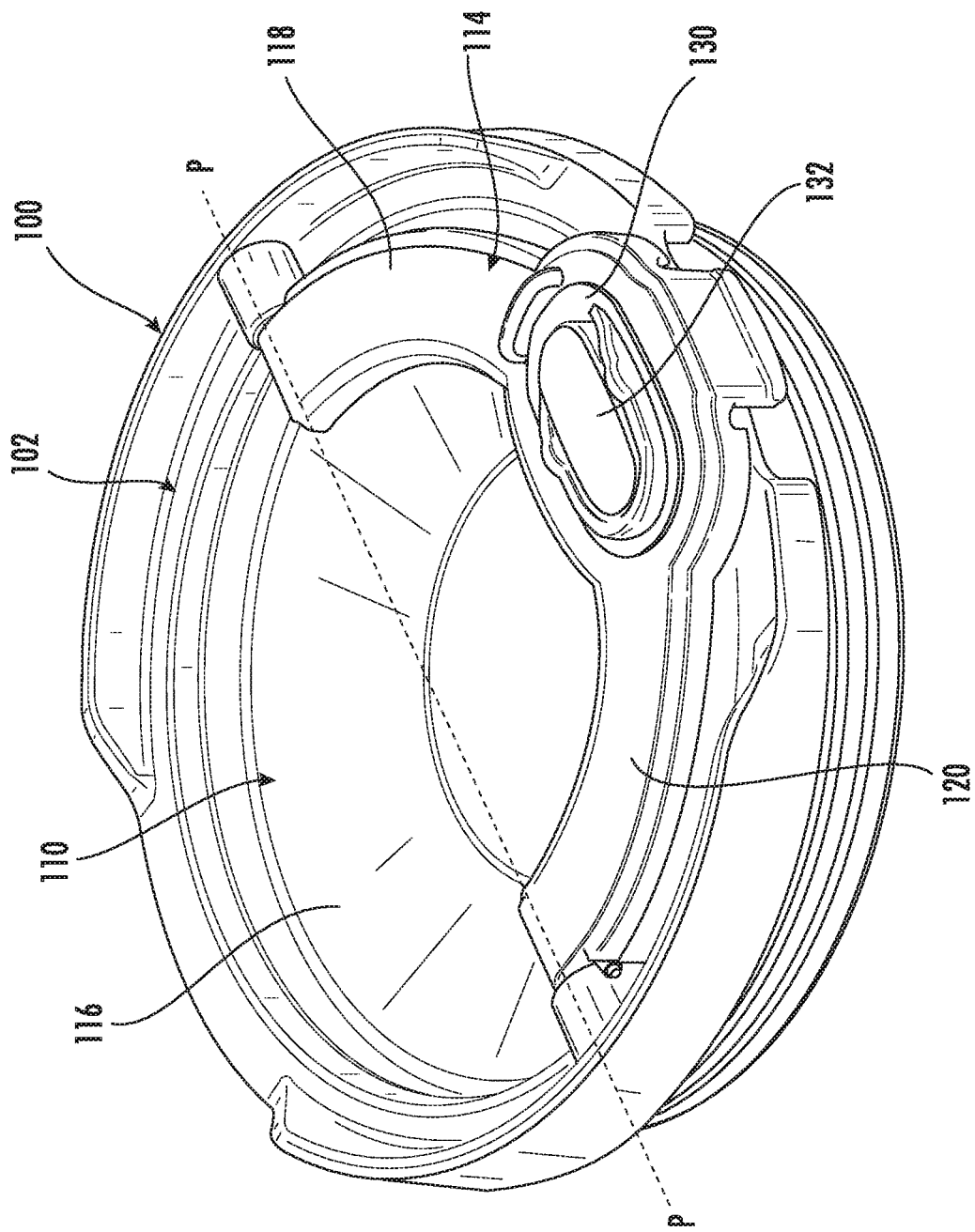
FIG. 10 is a perspective view of another accessory of an attachment suitable for use with a food processing system according to an embodiment.
Figure 11:
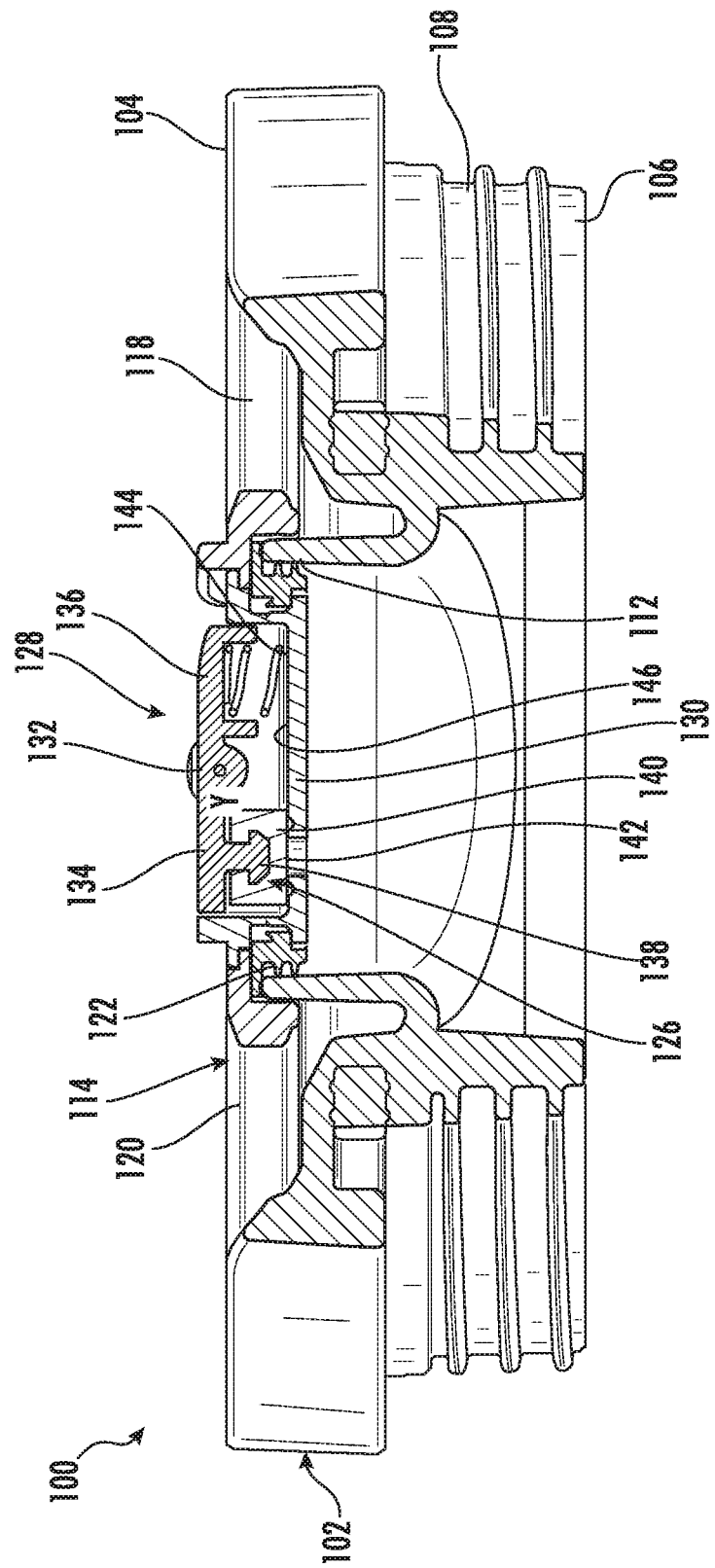
FIG. 11 is a cross-sectional view of the accessory of FIG. 10 in an open configuration according to an embodiment.
Figure 12:
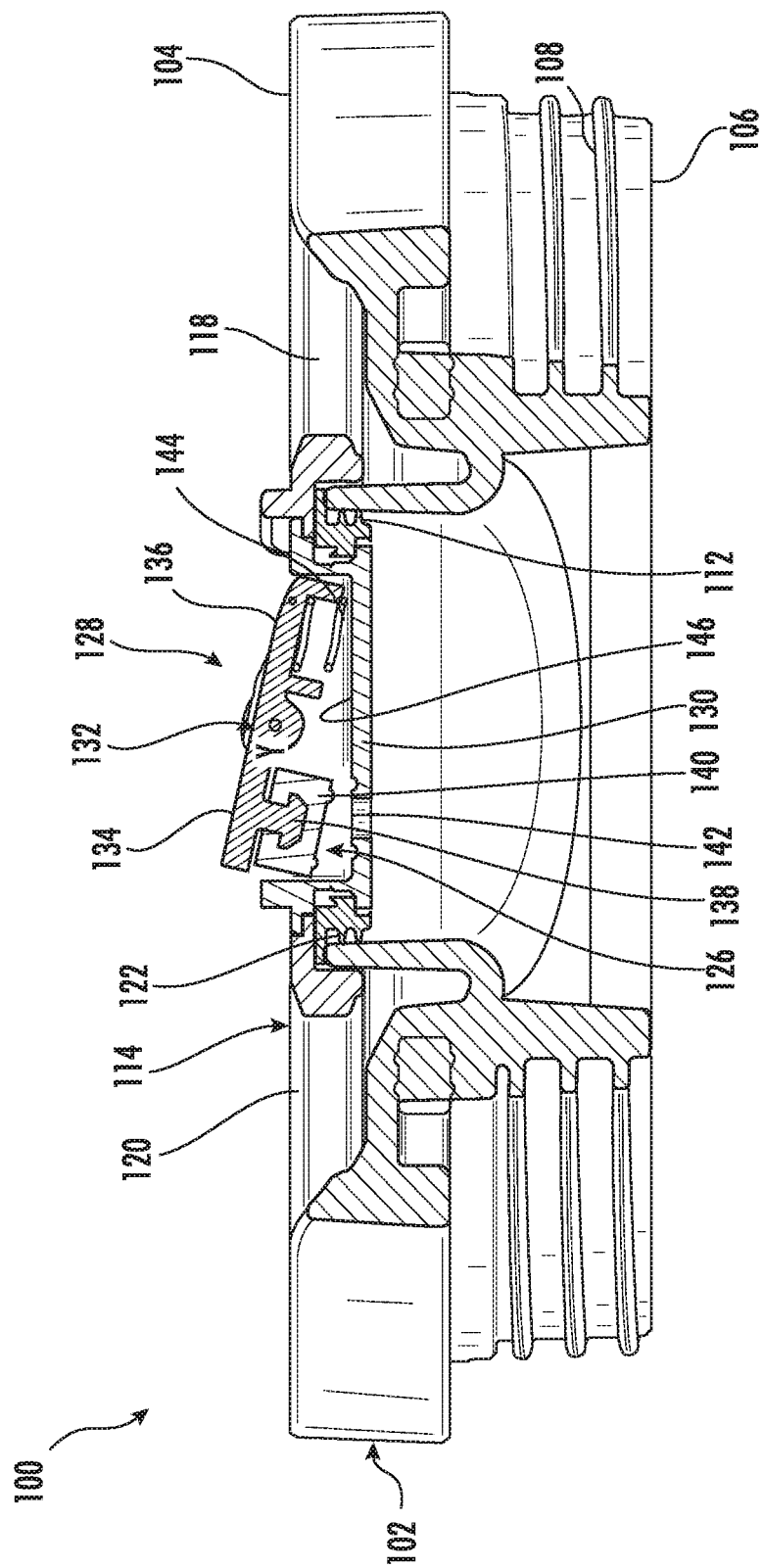
FIG. 12 is a cross-sectional view of the accessory of FIG. 10 in an open configuration according to an embodiment.

With specific reference now to FIGS. 10-12, the configuration of the body 102 of the accessory 100 is similar to the accessory of FIGS. 6-9. However, in the embodiment illustrated in FIGS. 10-12, the vacuum sealing assembly 126 is connected to the movable member 114. For example, as shown, the vacuum sealing assembly 126 is located within a central portion of the sealing element 122. In an embodiment, the movable member 114 additionally includes a release mechanism 128 operable to break the vacuum within the processing chamber 44, similarly located within the central portion of the sealing element 122. Further, the release mechanism may be operably coupled to or integrated with the vacuum sealing assembly 126.

In the illustrated, non-limiting embodiment, the movable member 114 includes a housing 130, the sealing element 122 being formed about an external periphery of the housing 130, and a connector or engagement member 132 is pivotally mounted to a portion of the housing 130. As shown, a pivot axis Y is defined at a central portion of the engagement member 132 such that a first side 134 of the engagement member 132 extends from the axis Y in a first direction and a second side 136 of the engagement member 132 extends from the axis Y in a second, opposite direction. Extending from the first side 134 of the engagement member 132, towards an interior of the housing 130 is a connector 138 having a sealing member 140 mounted thereto. When the engagement member 132 is in an normal or unactuated state, as shown in FIG. 11, the sealing member 140 is engaged with an adjacent opening 142 formed in the housing 130 and fluidly connected to the processing chamber 44.

Further, a biasing mechanism 144 is coupled to and extends between an internal surface 146 of the housing 130 and the engagement member 132 at a position offset from the pivot axis, such as at the second side 136 for example. The biasing force of the biasing mechanism 144 is configured to bias the engagement member 132, and therefore the connector 138 and sealing member 140 into engagement with the opening 142 to form an air tight and liquid tight seal. To break the vacuum within the processing chamber 44 while the sealing element 122 is engaged with the opening 112, the engagement member 132 is rotatable against the bias of the biasing mechanism 144, such as by applying a force to the second side 136 thereof. This rotation moves the sealing member 140 out of contact with the housing 130, thereby exposing the opening 142. Although the vacuum sealing assembly 126 described herein includes a connector 138 and a sealing member 140, other configurations of the vacuum sealing assembly 126, such as including an umbrella valve for example, are also contemplated herein. In such embodiments, rotation of the engagement member 132 against the bias of the biasing mechanism 144 may move the flange of the umbrella valve to expose a secondary opening and fluidly couple the processing chamber 44 to ambient. An accessory 100 having both a vacuum sealing assembly 126 and a release mechanism 128 associated therewith may allow a container 36 that does not have a separate vacuum sealing assembly or release mechanism to be used with a vacuum source.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A container assembly for a food processing system, the container assembly comprising:
   a sealable body including a chamber having an open end;
   an accessory connectable to said open end of said chamber, said accessory including:
      a body comprising:
         a first end, a second end, and a sidewall extending between the first and second ends;
         a wall offset from the first end, the wall including an opening adjacent the first end; and
         a member configurable with said opening, the member comprising a first arm and a second arm each pivotally mounted equidistant between said first end and said second end, the member configured to associate with said opening to selectively seal said opening,
   wherein when said opening is sealed by said member, said accessory is receivable within a base of the food processing system.

2. The container assembly of claim 1, wherein said member is rotatable about an axis between a first position, in which said member is adjacent said second end, and a second position, in which said member is adjacent said first end.

3. The container assembly of claim 2, wherein rotation of said member between said first position and said second position is within a plane including said opening.

4. The container assembly of claim 2, wherein said member includes a sealing element between the first arm and the second arm, the sealing element complementary to said opening and when said member is in said second position, said sealing element is associated with said opening.

5. The container assembly of claim 4, wherein said association between said sealing element and said opening forms an air-tight seal.

6. The container assembly of claim 1, wherein said container assembly further comprises a vacuum passage integral with said sealable body.

7. The container assembly of claim 6, wherein when said accessory is received within said base of the food processing system, said vacuum passage is arranged in fluid communication with a vacuum system of the base.

8. The container assembly of claim 1, wherein said sealable body includes at least one vacuum opening adjacent said second end, and said container assembly further comprises a vacuum sealing assembly movable relative to said at least one vacuum opening to fluidly couple said second end and said chamber.

9. The container assembly of claim 1, further comprises a release mechanism operable to selectively fluidly couple said chamber to an ambient atmosphere.

10. The container assembly of claim 1, wherein said accessory is a to-go lid.

11. The container assembly of claim 1, wherein said accessory is a rotatable blade assembly.

12. A food processing system comprising:
a food processor base including a rotary component and a vacuum system; and
an attachment configured for removable association with said food processor base, said attachment including:
a sealable body including a chamber having an open end; and
an accessory coupled to said open end of said chamber, said accessory including a body comprising:
a first end, a second end, and a sidewall extending between the first and second ends;
a wall offset from the first end, the wall having a sealable opening formed therein; and
a member configurable with said opening, the member comprising a first arm and a second arm each pivotally mounted equidistant between said first end and said second end, the member configured to associate with said sealable opening to selectively seal said sealable opening,
wherein said accessory is configured to be receivable within said food processor base.

13. The food processing system of claim 12, wherein said member is rotatable about an axis between said first position, in which said member is adjacent said second end, and said second position, in which said member is adjacent said first end.

14. The food processing system of claim 12, wherein said member includes a sealing element between the first arm and the second arm, the sealing element complementary to said sealable opening and when said member is in said second position, said sealing element is engaged with said sealable opening.

15. The food processing system of claim 12, wherein said container assembly further comprises a vacuum passage integral with said sealable body.

16. The food processing system of claim 15, wherein when said accessory is received within said food processor base, said vacuum passage is arranged in fluid communication with a vacuum system of the base.

17. The food processing system of claim 12, wherein said sealable body includes at least one vacuum opening adjacent said second end, and said attachment further comprises a vacuum sealing assembly movable relative to said at least one vacuum opening to fluidly couple said second end and said chamber.

18. The food processing system of claim 12, further comprises a release mechanism operable to selectively fluidly couple said chamber to an ambient atmosphere.

19. The food processing system of claim 12, wherein said accessory is a to-go lid.

20. The food processing system of claim 12, wherein said accessory is a rotatable blade assembly.

* * * * *